(12) United States Patent
Haile-Mariam et al.

(10) Patent No.: US 10,928,602 B2
(45) Date of Patent: Feb. 23, 2021

(54) FIBER OPTIC CABLE DEPLOYMENT ASSEMBLIES, SYSTEMS, AND METHODS

(71) Applicant: OPTERNA AM, INC., Sterling, VA (US)

(72) Inventors: Atikem Haile-Mariam, Alexandria, VA (US); Ravindra K. Vora, Freehold, NJ (US); Gerald J. Meier, Olathe, KS (US); Bret Matz, Leesburg, VA (US); Benoy Sarasan, Kochi (IN); Biji Mathew Arakkakudy, Kochi (IN); Anoop Murali, Kochi (IN); Binoy Puthussery, Kochi (IN)

(73) Assignee: OPTERNA AM, INC., Sterling, VA (US)

( * ) Notice: Subject to any disclaimer, the term of this patent is extended or adjusted under 35 U.S.C. 154(b) by 0 days.

(21) Appl. No.: 16/506,376

(22) Filed: Jul. 9, 2019

(65) Prior Publication Data

US 2019/0331870 A1    Oct. 31, 2019

Related U.S. Application Data

(63) Continuation of application No. 15/476,690, filed on Mar. 31, 2017, now Pat. No. 10,359,590.

(Continued)

(51) Int. Cl.
*G02B 6/44* (2006.01)
*G02B 6/38* (2006.01)

(52) U.S. Cl.
CPC .......... *G02B 6/444* (2013.01); *G02B 6/3897* (2013.01); *G02B 6/4441* (2013.01); *G02B 6/4457* (2013.01); *G02B 6/4471* (2013.01)

(58) Field of Classification Search
None
See application file for complete search history.

(56) References Cited

U.S. PATENT DOCUMENTS

| | | | |
|---|---|---|---|
| 2,744,708 | A | 5/1956 | Bedford, Jr. |
| 3,032,603 | A | 5/1962 | Whitley |

(Continued)

FOREIGN PATENT DOCUMENTS

| | | |
|---|---|---|
| CN | 204925468 U | 12/2015 |
| EP | 0411978 A1 | 2/1991 |

(Continued)

OTHER PUBLICATIONS

Extended European Search Report (EESR) for European Application No. EP 17164793.6, dated Nov. 30, 2017 (10 pages).

*Primary Examiner* — Tina M Wong
(74) *Attorney, Agent, or Firm* — MH2 Technology Law Group LLP

(57) ABSTRACT

A fiber distribution system includes a fiber distribution terminal, an assembly separate from the fiber distribution terminal, a third fiber optic cable, and an end-user fiber optic device. The fiber distribution terminal includes a first fiber optic cable, a first rotatable spool storing a portion of the first fiber optic cable, and a first adapter optically coupled to the first fiber optic cable. The assembly includes a second rotatable spool storing a second fiber optic cable optically coupled to the first adapter, and a second adapter optically coupled to the second fiber optic cable. The third fiber optic cable is optically coupled to the second adapter. The end-user fiber optic device is optically coupled to the third fiber optic cable.

23 Claims, 26 Drawing Sheets

Related U.S. Application Data

(60) Provisional application No. 62/318,045, filed on Apr. 4, 2016.

(56) References Cited

U.S. PATENT DOCUMENTS

| | | | |
|---|---|---|---|
| 4,726,534 A | | 2/1988 | Chenoweth |
| 4,737,010 A | | 4/1988 | Le Maitre et al. |
| 4,884,862 A | | 12/1989 | Kofod |
| 4,898,450 A | | 2/1990 | Jannson et al. |
| 4,961,623 A | | 10/1990 | Midkiff et al. |
| 5,644,671 A | | 7/1997 | Goetter et al. |
| 6,272,276 B1 | * | 8/2001 | Potteiger ............ G02B 6/3897 385/134 |
| 6,272,776 B1 | * | 8/2001 | Santorsola ............ G09F 11/23 116/316 |
| 6,322,019 B1 | * | 11/2001 | Talamini, Sr. ....... G02B 6/4457 242/388 |
| 6,418,262 B1 | | 7/2002 | Puetz et al. |
| 6,802,724 B1 | | 10/2004 | Mahony |
| 6,814,328 B1 | * | 11/2004 | Li ........................ G02B 6/4457 242/400.1 |
| 7,331,722 B2 | | 2/2008 | Tan |
| 7,352,945 B2 | | 4/2008 | Holmberg et al. |
| 7,366,391 B2 | | 4/2008 | Ellison et al. |
| 7,522,806 B2 | | 4/2009 | Hendrickson et al. |
| 7,598,457 B2 | | 10/2009 | Allen et al. |
| 7,826,705 B2 | | 11/2010 | McGranahan et al. |
| 7,903,922 B2 | | 3/2011 | Momotsu et al. |
| 8,081,857 B2 | | 12/2011 | Nair et al. |
| 8,472,773 B2 | | 6/2013 | de Jong |
| 8,903,215 B2 | | 12/2014 | Mathew et al. |
| 9,036,974 B2 | * | 5/2015 | LeBlanc ................ G02B 6/46 385/134 |
| 9,042,700 B2 | * | 5/2015 | Smith .................. B65H 75/146 385/135 |
| 2004/0170369 A1 | * | 9/2004 | Pons .................. G01M 11/3109 385/135 |
| 2007/0140623 A1 | | 6/2007 | Desanti |
| 2008/0011990 A1 | | 1/2008 | Kostet et al. |
| 2008/0170831 A1 | * | 7/2008 | Hendrickson ........ G02B 6/4466 385/135 |
| 2009/0060441 A1 | | 3/2009 | Kowalczyk et al. |
| 2010/0322580 A1 | | 12/2010 | Beamon et al. |
| 2011/0103761 A1 | | 5/2011 | LeBlanc et al. |
| 2013/0032676 A1 | | 2/2013 | Chapman |
| 2013/0034336 A1 | | 2/2013 | Cassell et al. |
| 2013/0195417 A1 | * | 8/2013 | Torman ................ G02B 6/4471 385/135 |
| 2013/0200193 A1 | * | 8/2013 | Lichoulas ............ B65H 75/285 242/118.3 |
| 2013/0209049 A1 | * | 8/2013 | Kowalczyk .......... G02B 6/4457 385/135 |
| 2013/0209052 A1 | | 8/2013 | Subhash et al. |
| 2014/0091169 A1 | * | 4/2014 | Ott ....................... G02B 6/4471 242/594.5 |
| 2014/0153890 A1 | * | 6/2014 | Sayres .................. B29C 48/12 385/135 |
| 2014/0161411 A1 | * | 6/2014 | Slater .................. G02B 6/4457 385/135 |
| 2014/0219622 A1 | * | 8/2014 | Coan .................... G02B 6/4479 385/135 |
| 2014/0259602 A1 | | 9/2014 | Thompson |
| 2015/0063770 A1 | * | 3/2015 | Kowalczyk ............ G02B 6/445 385/135 |
| 2015/0093088 A1 | * | 4/2015 | Matz .................... G02B 6/4446 385/135 |
| 2015/0212284 A1 | | 7/2015 | Lichoulas et al. |
| 2015/0219857 A1 | | 8/2015 | Lichoulas et al. |
| 2015/0355428 A1 | * | 12/2015 | Leeman ................ G02B 6/4454 385/135 |
| 2016/0033733 A1 | * | 2/2016 | Burek .................. G02B 6/4457 385/135 |
| 2016/0299307 A1 | * | 10/2016 | Krampotich ......... G02B 6/4452 |
| 2018/0059352 A1 | * | 3/2018 | Wells .................. G02B 6/4457 |
| 2018/0113268 A1 | * | 4/2018 | Van Baelen .......... G02B 6/444 |
| 2019/0041597 A1 | * | 2/2019 | Marcouiller ......... G02B 6/4478 |
| 2019/0331870 A1 | * | 10/2019 | Haile-Mariam ..... G02B 6/4457 |

FOREIGN PATENT DOCUMENTS

| | | |
|---|---|---|
| GB | 2373493 A | 9/2002 |
| GB | 2493408 A | 2/2013 |
| WO | WO 0073835 A1 | 12/2000 |
| WO | WO 2014072368 A1 | 5/2014 |
| WO | WO 2014096134 A1 | 6/2014 |
| WO | WO 2015036548 A1 | 3/2015 |
| WO | WO 2015145055 A1 | 10/2015 |

* cited by examiner

FIBER OPTIC CABLE DEPLOYMENT ASSEMBLIES, SYSTEMS, AND METHODS

CROSS REFERENCE TO RELATED APPLICATIONS

This application is a continuation of U.S. application Ser. No. 15/476,690, filed Mar. 31, 2017, which claims priority to U.S. Provisional Application No. 62/318,045, filed Apr. 4, 2016, which are hereby incorporated herein in their entirety by reference.

BACKGROUND

Field

Embodiments of this disclosure relate to assemblies, systems, and methods for deploying fiber optic cable to a fiber optic device.

Background

Due to the high demand for telecommunication services, fiber optic networks are becoming more popular worldwide. To build fiber optic networks, a service provider installs multiple fiber optic cables, which can require multiple fiber distribution terminals that optically couple the fibers of fiber optic cables. Fiber distribution terminals can provide multiple access points to a fiber optic network, which is useful when providing network access to a plurality of separate units in multiple-unit buildings such as apartments, condominiums, businesses, and the like.

A plurality of end-user separate units can include an end-user fiber optic device such as optical node terminals, Ethernet routers, desktop computers, laptops and/or presentation screens and the like. Each end-user fiber optic device can be located at different locations within each separate subscriber unit. Thus, the length and orientation of each fiber optic cable running to the end-user fiber optic device varies from one subscriber end-user device to another subscriber end-user device. So for each installation, the installer must cut the fiber optic cable to a specific length and then fix a connection between the subscriber end-user device and a network terminal. Moreover, each subscriber end-user device has specific adapter ports that require a specific connector installed at the fiber optic cable. So each time the installer must configure specific connectors that are adapted to optically couple with the specific adapter ports of the subscriber end-user device.

Typically, the network installer performs these tasks at the installation site as required by the particular network terminal and subscriber devices. This increases the burden of the installer to carry the necessary adapters, connectors, optical fiber cables, and fiber distribution terminals as well as various installation tools. This is also time consuming and requires specific skills such as splicing of the optical fiber cables, and configuring the specific connectors to each optical fiber.

Accordingly, there is a need for fiber optic cable deployment assemblies and systems that can be easily installed to connect a subscriber end-user device to a network.

BRIEF SUMMARY

In some embodiments, an assembly for deploying fiber optic cable includes a housing, a spool, and a component module. The housing defines a cavity and includes a wall. The wall defines an opening that allows a first portion of a fiber optic cable to pass there through. The spool stores a second portion of the fiber optic cable and is rotatably coupled to the housing within the cavity of the housing. The component module is releasably coupled to the housing. The component module includes an adapter configured to optically couple the fiber optic cable to another fiber optic cable.

The fiber optic cable stored on the spool can include a pre-terminated fiber connector configured to be optically coupled to the adapter. The pre-terminated fiber connector can be configured to be releasably coupled to the adapter.

The spool can include a connector holder configured to releasably couple the pre-terminated fiber connector to the spool. The connector holder can be configured to be releasably coupled to a panel of the spool.

The assembly can include a fan out that separates fibers of the fiber optic cable. The fan out can be coupled to the spool. The spool can also include a retaining structure configured to releasably couple the fan out to the spool.

The spool can be positioned between the component module and the housing such that the component module secures the spool within the cavity defined by the housing. The spool can rotate while the component module remains stationary.

The component module can be releasably coupled to the housing at a plurality of orientations relative to the housing.

The assembly is configured to be mounted to a mounting surface. In some embodiments, the assembly can be configured to be mounted to a mounting bracket that (a) positions the opening defined by the wall of the housing within a cavity defined by the mounting surface and (b) positions the adapter on a side of the mounting surface opposite of the cavity defined by the mounting surface. In some embodiments, the assembly is configured to be mounted to a mounting bracket that positions the opening defined by the wall of the housing and the adapter on the same side of the mounting surface.

The component module can also include an electronic component. The electronic component can be an access point to a wireless network or an internet of things gateway.

The assembly can also include a second component module releasably coupled to the component module comprising the adapter. The second component module can include an electronic component or another adapter.

The component module comprising the adapter can also include at least two locations configured to secure the adapter.

In some embodiments, a fiber distribution system includes a fiber distribution terminal. The fiber distribution terminal includes a first fiber optic cable, a rotatable spool storing a portion of the first fiber optic cable, and a first adapter optically coupled to the first fiber optic cable. The system further includes an assembly, separate from the fiber distribution terminal, that includes a second rotatable spool storing a second fiber optic cable optically coupled to the first adapter. The assembly also includes a second adapter optically coupled to the second fiber optic cable, and includes a third fiber optic cable optically coupled to the second adapter. And the system includes an end-user fiber optic device optically coupled to the third fiber optic cable.

The assembly can be positioned at a subscriber location. The subscriber location can be a separate unit of a multi-unit building. The fiber distribution terminal can be located outside of the subscriber location.

The system can also include a second assembly, separate from the fiber distribution terminal. The second assembly can include a third rotatable spool storing a fourth fiber optic cable. The second assembly can also include a third adapter optically coupled to the fourth fiber optic cable. The system can also include a fifth fiber optic cable optically coupled to the third adapter, and a second end-user fiber optic device optically coupled to the fifth fiber optic cable. The fiber distribution terminal can include a fourth adapter that optically couples the first fiber optic cable to the fourth fiber optic cable.

The first assembly can also include a housing that defines a cavity and includes a wall. The wall can define an opening through which the third fiber optic cable passes. The second spool can be rotatably mounted to the housing within the cavity of the housing. The first assembly can also include a component module releasably coupled to the housing. The component module is configured to releasably couple with the second adapter.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

The features and advantages of the embodiments will become more apparent from the detailed description set forth below when taken in conjunction with the drawings, in which like reference characters identify corresponding elements throughout.

DETAILED DESCRIPTION

The disclosed embodiment(s) merely exemplify the invention. The scope of the invention is not limited to the disclosed embodiment(s). The invention is defined by the claims appended hereto.

The embodiment(s) described, and references in the specification to "an example," "for example," "one embodiment," "an embodiment," "an example embodiment," "some embodiments," "exemplary," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
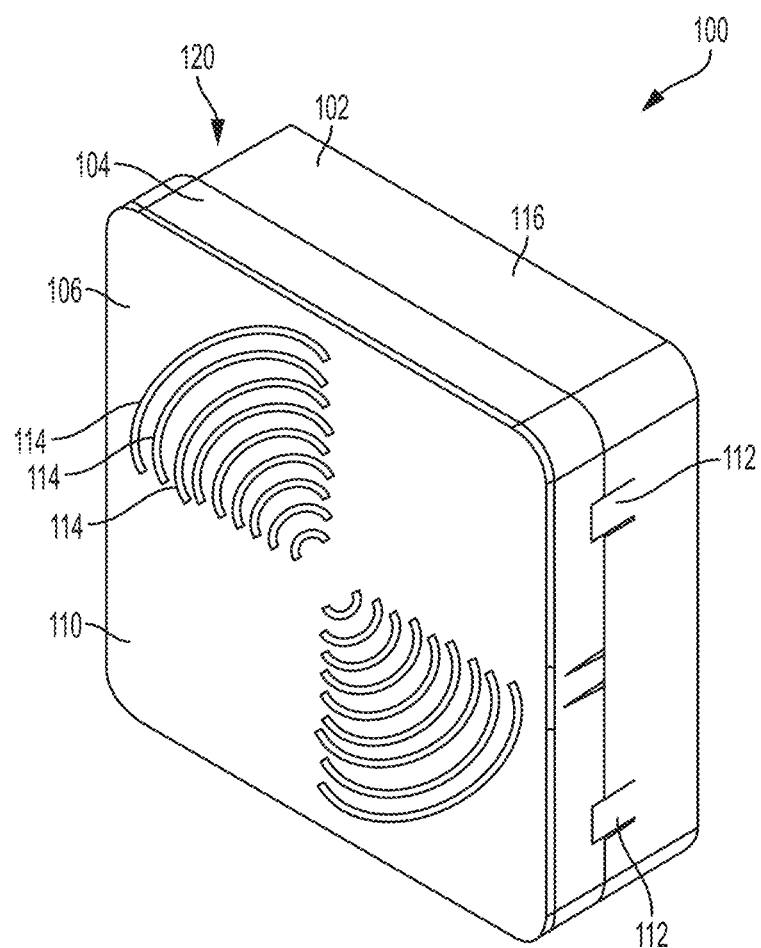
FIG. 1 is a perspective view of an assembly for deploying fiber optic cable, according to an embodiment.
Figure 2:
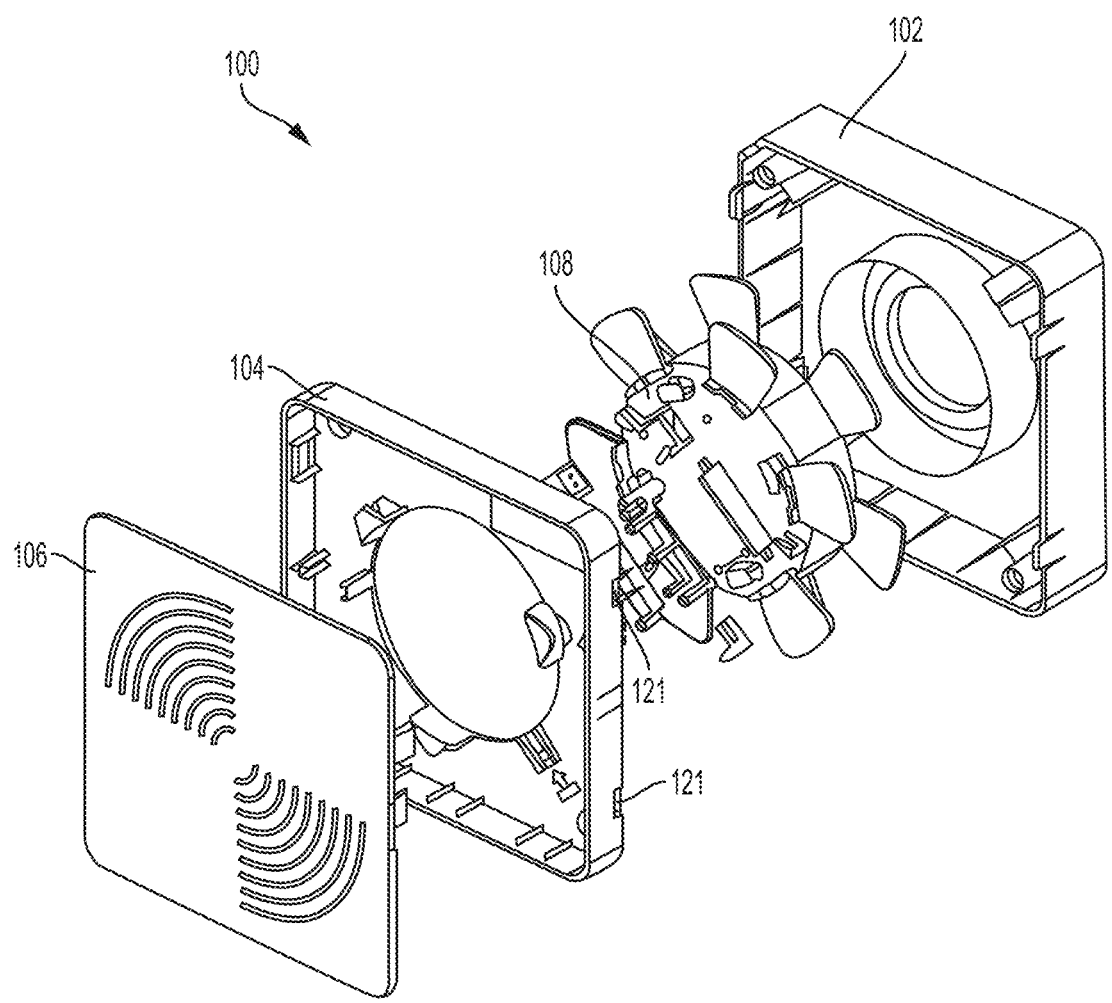
FIG. 2 is an exploded perspective view of an assembly for deploying fiber optic cable, according to an embodiment.

FIGS. 1 and 2 illustrate an embodiment of an assembly 100 for deploying fiber optic cable. Assembly 100 can include a housing 102, a spool 108 (shown in FIG. 2), a component module 104, and a cover 106. Assembly 100 can be used to optically couple a subscriber end-user fiber optic device to a network, for example, to a separate fiber distribution terminal of the network. Housing 102 can be configured to store spool 108, which stores at least a portion of a fiber optic cable. Component module 104 can be configured to secure spool 108 within housing 102 and can include at least one of (a) an adapter for optically coupling the fiber optic cable stored on spool 108 with another fiber optic cable, and (b) an electronic component. And cover 106 can be configured to close a cavity defined by component module 104. Assembly 100 can be configured to be mounted to a mounting surface, e.g., a wall, pole, or shelf, either directly or indirectly using a mounting bracket. Embodiments of housing 102, spool 108, component module 104, and cover 106 are described in more detail below.

Exemplary Housings

Figure 3:
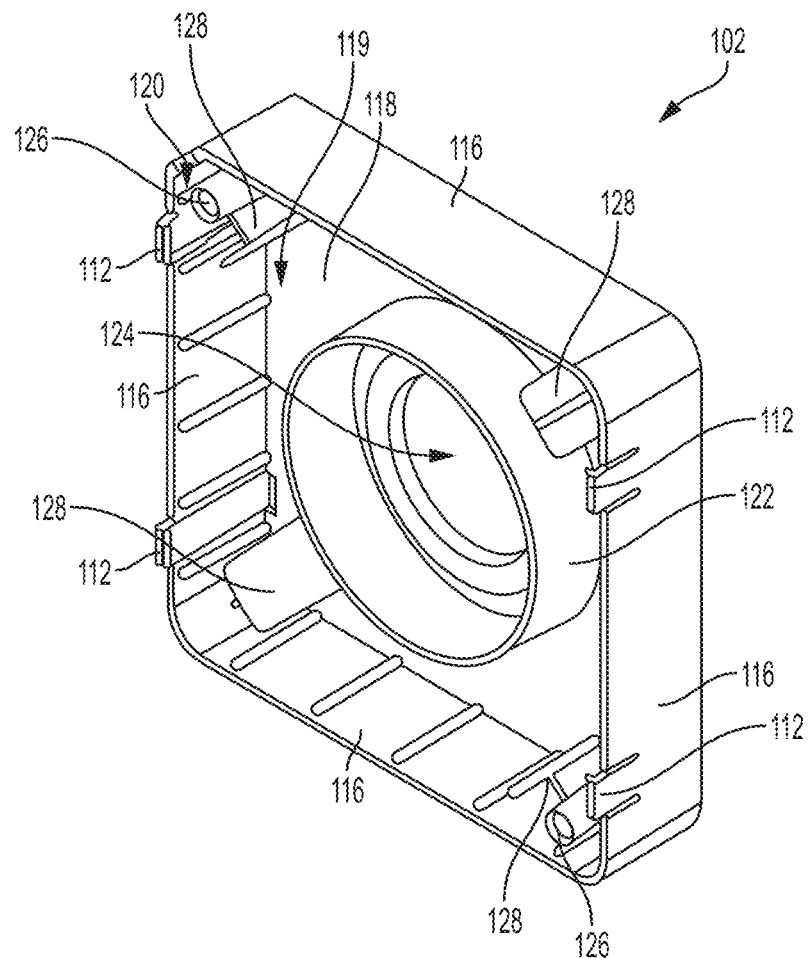
FIG. 3 is a perspective view of a housing of an assembly for deploying fiber optic cable, according to an embodiment.

Referring collectively to FIGS. 1-3, housing 102 can define a cavity 119 configured to receive spool 108. For example, housing 102 can include a panel 118 (which can be a back wall of housing 102, as shown in FIGS. 1-3) and walls 116. Walls 116 can be, for example, exterior side walls of housing 102, as shown in FIGS. 1-3, in some embodiments. Walls 116 extend from panel 118 such that panel 118 and walls 116 collectively define cavity 119. In some embodiments, walls 116 extend around substantially the entire perimeter of panel 118, as shown in FIGS. 1-3. In other embodiments, walls 116 extend around only a portion or portions of the perimeter of panel 118.

As shown in FIGS. 1-3, panel 118 is planar in some embodiments. In other embodiments, panel 118 is non-planar. As shown in FIGS. 1-3, panel 118 can have substantially square shape. In other embodiments, panel 118 can have other suitable shapes such as substantially rectangular shapes.

In some embodiments, walls 116 define at least one opening that allows one or more fiber optic cables to enter cavity 119. For example, walls 116 can define an opening 120 at a corner of housing 102, as shown in FIGS. 1-3. In some embodiments (not shown), walls 116 can define another opening at another corner of housing 102, for example, at the corner diagonal from opening 120, or at any other location on walls 116.

Housing 102 can be configured to releasably couple with component module 104 such that an installer can easily and repeatedly attach or detach component module 104 to housing 102. For example, housing 102 can include a plurality of prongs 112 extending from walls 116. Prongs 112 are configured to interlock with respective grooves 121 defined by component module 104 to releasably couple component module 104 to housing 102. In some embodiments, as best seen in FIG. 3, housing 102 includes four prongs 112—two prongs on one wall 116 and two prongs on the opposing wall 116. In other embodiments (not shown), each wall 116 can include a prong 112. In other embodiments (not shown), housing 102 includes less than four prongs 112 or more than four prongs 112. In other embodiments, housing 102 and component module 104 can be releasably coupled together by a friction fit between respective surfaces of housing 102 and component module 104.

Housing 102 can also include a boss 122 extending from panel 118. Boss 122 is configured to rotatably couple spool 108 to housing 102. Boss 122 is configured (i.e., shaped and sized) to fit within a corresponding cavity defined by spool 108 such that spool 108 can rotate about an axis defined by boss 122. As best seen in FIG. 3., boss 122 is located at the center of panel 118. In other embodiments (not shown), boss 122 is off-centered on panel 118.

Boss 122 can be cylindrical and hollow, as shown in FIG. 3, in some embodiments. In some of such embodiments, panel 118 defines an opening 124 aligned with the center of hollow boss 122. In some applications, opening 124 provides another opening for allowing fiber optic cables to enter cavity 119 of housing 102.

Housing 102 can be configured to be mounted directly to a mounting surface (for example, a wall, pole, or shelf) or can be configured to be mounted to a bracket that is mounted to the mounting surface. In some embodiments, housing 102 includes one or more channels 126 configured to receive a fastener (for example, a bolt, screw, or nail) to secure housing 102 to the mounting surface or mounting bracket. In some embodiments, channels 126 are aligned with openings defined by a mounting bracket to which housing 102 will be coupled. Channels 126 can be located in the corners of housing 102 in some embodiments.

In some embodiments, housing 102 also includes one or more cable guides 128 for efficiently containing fiber optic cable stored on spool 108 rotatably coupled to housing 102. For example, housing 102 can include four cable guides 128 as shown in FIG. 3. Cable guides 128 extend from panel 118. Cable guides 128 include a substantially planar surface facing housing 102. The planar surface of cable guides 128 is perpendicular to the radial direction of boss 122. Cable guides 128 can be positioned in each corner of housing 102 as shown in FIG. 3, in some embodiments.

In some embodiments, housing 102 is the closet component of assembly 100 to the mounting surface and/or mounting bracket. In other embodiments, assembly 100 can include other components, for example, another housing, between housing 102 and the mounting surface.

Exemplary Spools

Figure 8:
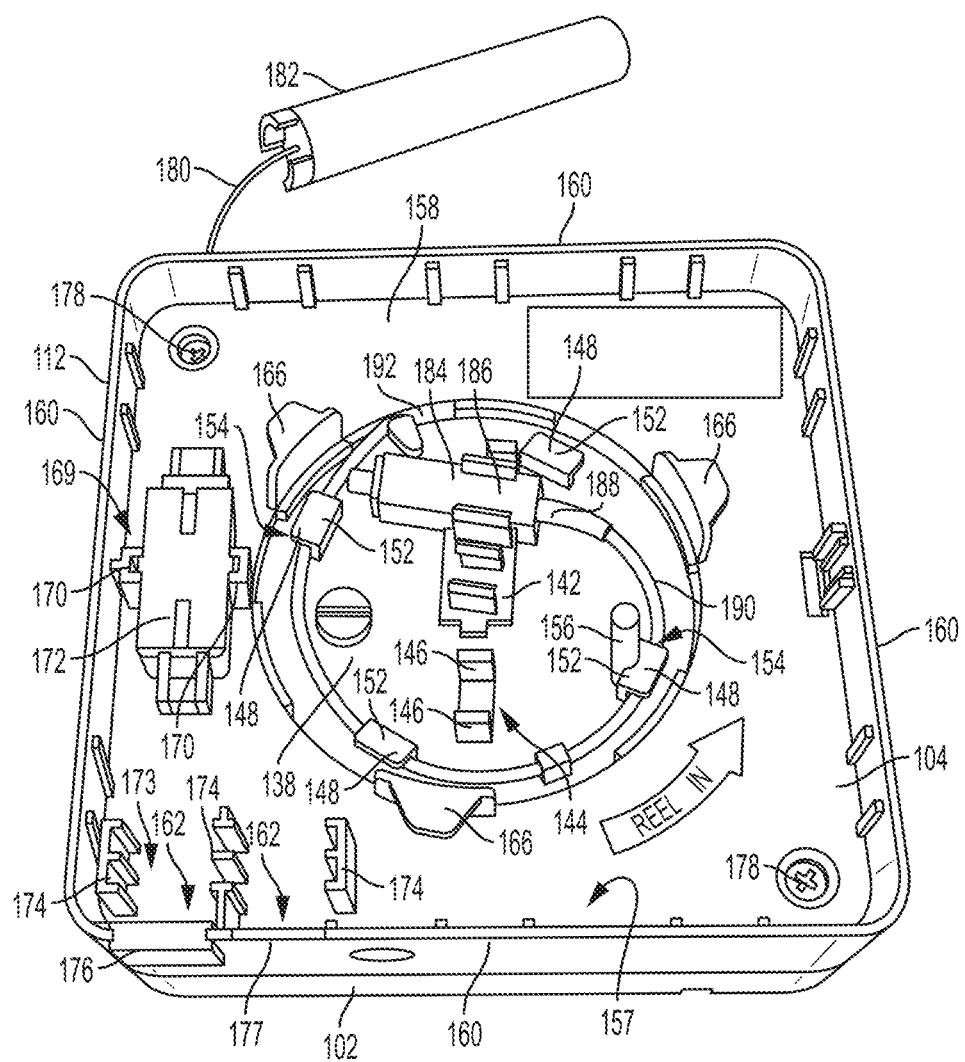
FIG. 8 is a perspective view of a component module and a housing of an assembly for deploying fiber optic cable, according to an embodiment.

Referring collectively to FIGS. 2, 4-6, and 8, spool 108 is configured to be rotatably coupled to housing 102 and to store at least a portion of one or more fiber optic cables 180 (shown in FIG. 8). In some embodiments, the one or more fiber optic cables 180 can each have one or more pre-terminated fiber connectors 186 at an end portion 184 of fiber optic cable 180. Connectors 186 can be configured to be optically couple to one or more adapter 172 (shown in FIG. 8). Connectors 186 can be a subscriber or standard connector (SC connector), a local or Lucent connector (LC), or any combination of SC connectors and LC connectors. In some embodiments, connectors 186 can be 1×SC simplex connectors, 1×LC duplex connectors, 2×SC simplex connectors, 2×LC duplex connectors, or any combination thereof. In other embodiments, connectors 186 can be connectors other than SC or LC connectors.

Each connector 186 can be releasably and optically coupled to a respective adapter 172 in some embodiments. In some embodiments, connector 186 includes a pre-terminated fiber ferrule, for example, a SC fiber ferrule or LC fiber ferrule. The fiber ferrule of each connector 186 can be configured to be received within adapter 172, for example, an SC or LC adapter.

Spool 108 can include a cylindrical drum 130 configured to store the one or more fiber optic cables 180. For example, at least a portion of a fiber optic cable 180 can be wrapped around cylindrical drum 130. In some embodiments, the radius of cylindrical drum 130 is at least the minimum bend radius of the fiber optic cable 180 being stored on drum 130. In some embodiments, spool 108 is configured to store about 25 feet to about 150 feet of fiber optic cable 180, for example, about 50 feet.

In some embodiments, cylindrical drum 130 is configured to store up to about 50 feet of fiber optic cable. In some embodiments, if more than the maximum cable capacity of cylindrical drum 130, for example, more than 50 feet of cable, is needed for a particular installation, assembly 100 can be releasably and operatively coupled to an excess cable spool assembly 181 having a second spool 183 that stores cable 185 in excess of the maximum cable capacity of cylindrical drum 130, for example, the cable portion in excess of about 50 feet.

Figure 25:
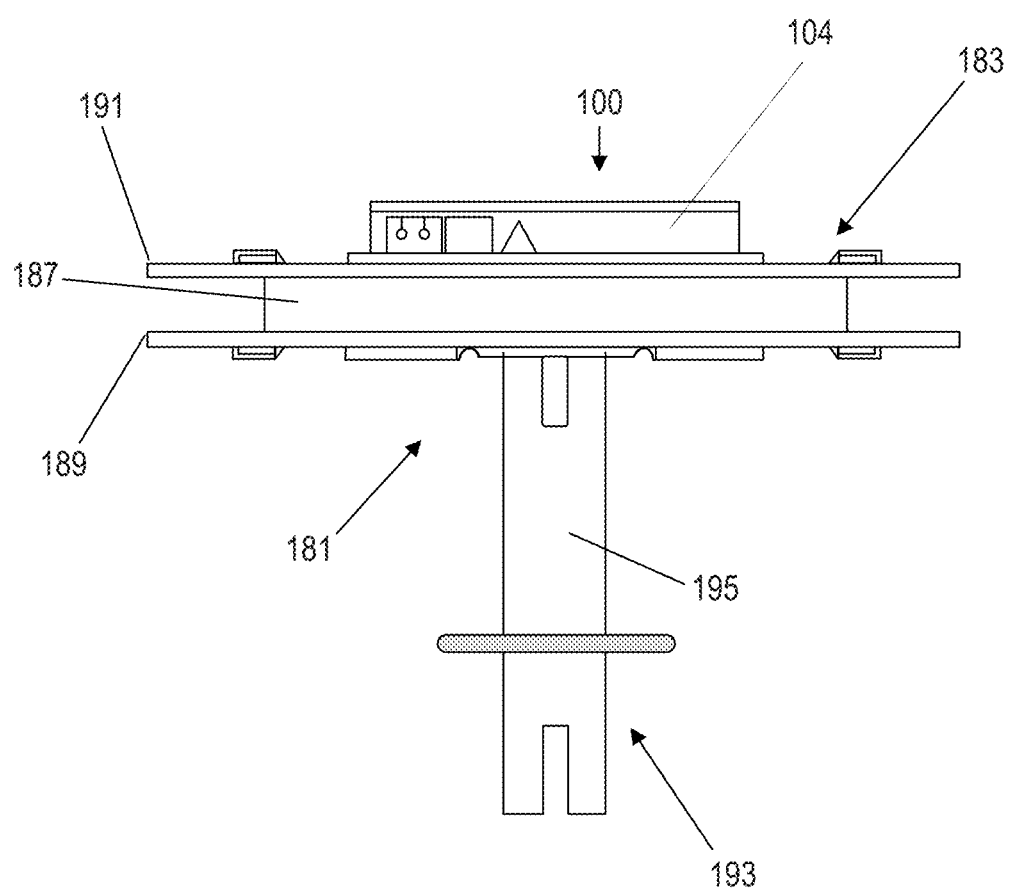
FIG. 25 is a side view of an assembly for deploying fiber optic cable coupled to an excess cable spool assembly, according to an embodiment.
Figure 26:
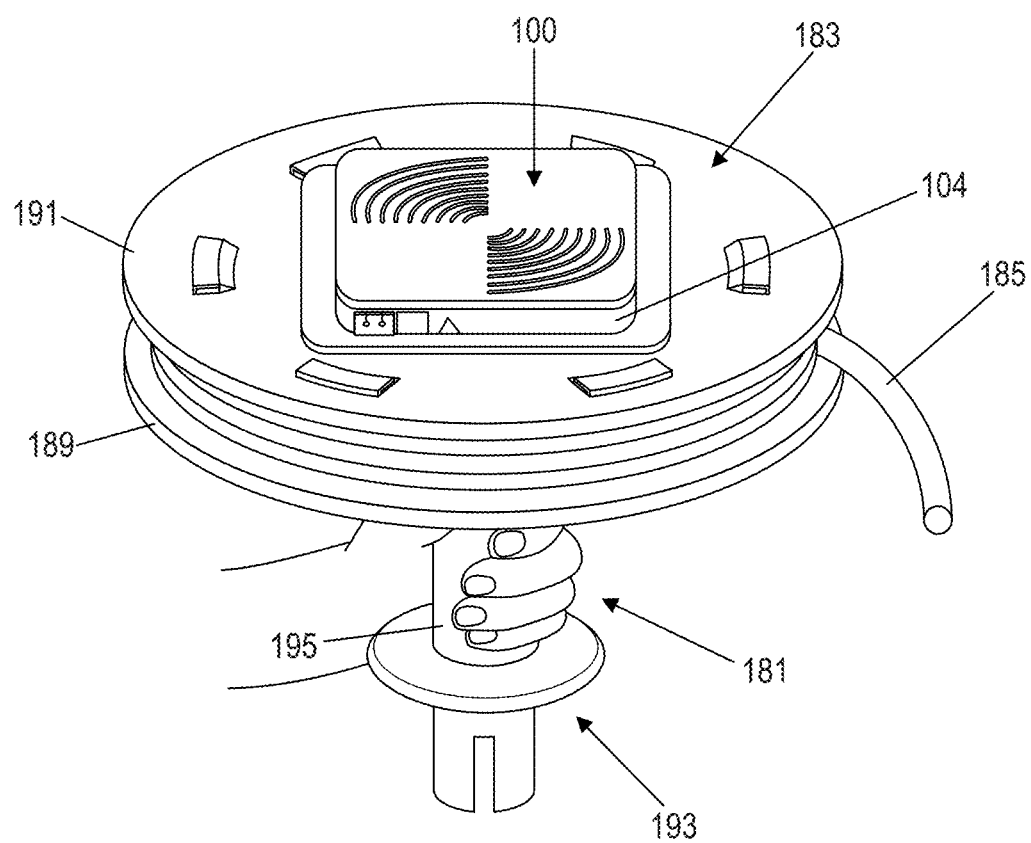
FIG. 26 is a perspective view of an assembly for deploying fiber optic cable coupled to an excess cable spool assembly, according to an embodiment.

FIGS. 25 and 26 illustrate an exemplary excess cable spool assembly 181 according to an embodiment. In some embodiments, second spool 183 includes an excess cylindrical drum 187 around which excess cable 185 is wound, a first flange 189 extending radially from cylindrical drum 187, and a second flange 191 extending radially from cylindrical drum 187. Cylindrical drum 187 is axially between first and second flanges 189 and 191. In some embodiments, spool 183 is made of a recyclable material, for example, cardboard or a recyclable plastic. In some embodiments, spool 183 is made of a non-recyclable, material.

In some embodiments, excess cable spool assembly 181 also includes a handle 193 rotatably attached to second spool 183. Handle 193 can be removably or fixedly attached to spool 183. Handle 193 can be made of, for example, plastic or any other suitable material with sufficient rigidity to withstand the forces applied to assembly 181 while paying out excess cable 185. As shown in FIGS. 25 and 26, handle 193 can be coupled to second spool 183 at the bottom center of second spool 183, for example, at the center of flange 189 and axially aligned with drum 187. Handle 193 includes a portion 195 configured (i.e., sized and shaped) to allow an installer to grab and control excess cable spool assembly 181 with, for example, one hand.

In some embodiments, assembly 100 is releasably attached to flange 191, and handle 193 is attached to flange 189 opposite the releasably mounted assembly 100. For example, a portion of assembly 100, for example, housing 102 or component module 104 of assembly 100, can be releasably attached to flange 191 using an interference fit connection (for example, a snap fit or press fit connection), an adhesive or bonding agent, or any other suitable releasable coupling mechanism.

As shown in FIG. 26, for example, a user pays-out (i.e., unwraps around drum 187) excess cable 185 by grabbing operating portion 195 with one hand, and then routing excess cable 185 to a desired location, for example, a fiber terminal. As cable 185 is routed to the desired location and while the operating holds operator portion 195 of handle 193, second cable spool 183 rotates relative to handle 193 to allow easy pay out of excess cable portion 185. After the excess cable 185 is paid out (for example, after the entire portion of excess cable 185 is removed from spool 183), assembly 100 can be decoupled from excess cable spool assembly 181, and subsequently installed by the installer.

Fiber optic cable 180 can be single- or multi-fiber optic cable. In some embodiments, fiber optic cable 180 has a diameter in range of about 2 mm to about 5 mm, and can be as small as 0.9 mm or smaller. In some embodiments, fiber optic cable 180 has a maximum diameter of no more than about 3 mm. In some embodiments, fiber optic cable 180 is single mode or multi-mode fiber. In some embodiments, fiber optic cable 180 is bend insensitive fiber.

Figure 4:
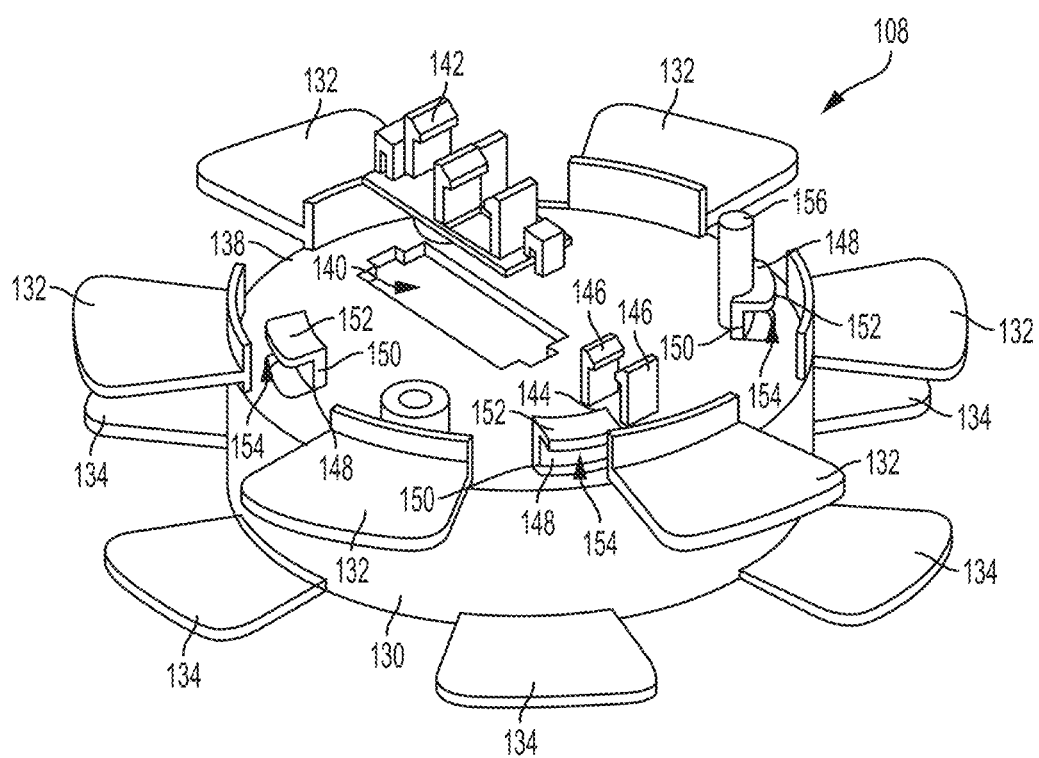
FIG. 4 is a perspective view of a spool of an assembly for deploying fiber optic cable, according to an embodiment.

In some embodiments, spool 108 includes cable retention structures that are configured to keep fiber optic cable 180 wrapped around cylindrical drum 130. For example, as shown in FIGS. 2 and 4-6, the cable retention structures can be a plurality of spaced apart tabs 132 and 134 extending radially outward from the axial ends of cylindrical drum 130. Tabs 134 extend from the axial end of cylindrical drum 130 closest to housing 102, and tabs 132 can extend form the axial end of cylindrical drum 130 farthest from housing 102. Spool 108 can include six tabs 132 and six tabs 134 in some embodiments. In other embodiments, spool 108 can include less than or more than six tabs 132 or tabs 134. Tabs 132 and tabs 134 can be equally spaced apart about the circumference of drum 130. In some embodiments, tabs 132 and tabs 134 are aligned relative to each other such that tabs 132 are axially aligned with the gaps between tabs 134, as best seen in FIG. 4.

In other embodiments (not shown), the cable retention structures can be solid flanges (as opposed to spaced apart tabs) that extend from the axial ends of cylindrical drum 130.

Figure 5:
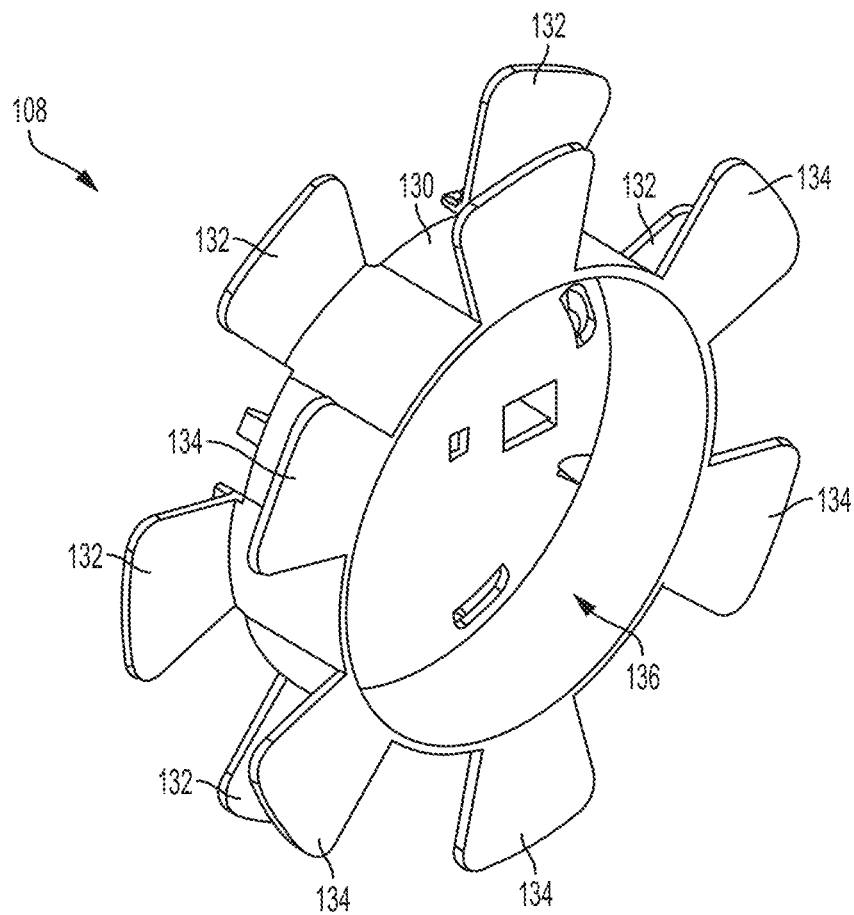
FIG. 5 is a rear perspective view of a spool of an assembly for deploying fiber optic cable, according to an embodiment.

As best seen in FIG. 5, cylindrical drum 130 can define a cavity 136 that has an opening on the axial end closest to housing 102 in some embodiments. Cavity 136 is configured (i.e., shaped and sized) to rotatably receive boss 122 on housing 102. When boss 122 is received within cavity 136 of spool 108, spool 108 is rotatably coupled to housing 102 such that spool 108 can rotate relative to housing 102. Spool 108 can rotate in both clockwise and anti-clockwise directions in some embodiments. Rotation of spool 108 allows a user to easily reel-in (i.e., wrap around drum 130) fiber optic cable 180 or pay-out (i.e. unwrap around drum 130) fiber optic cable 180 during deployment.

In other embodiments (not show), spool 108 can define a boss that is configured to be received in a cavity defined by housing 102 such that spool 108 is rotatably coupled to housing 102.

Spool 108 can also include a panel 138 configured to mount one or more components. In some embodiments, panel 138 is integral with cylindrical drum 130. Panel 138 can be positioned at the axial end of cylindrical drum 130 farthest from housing 102. As shown in FIGS. 2 and 4-6, panel 138 can be substantially circular and sized to match cylindrical drum 130.

Panel 138 can define one or more openings 140 configured to mate with other components. For example, as shown in FIGS. 2 and 4-6, panel 138 can include one opening 140 configured to mate with connector holders configured to store one or more connectors 186 of fiber optic cables 180 stored on cylindrical drum 130. In some embodiments, opening 140 is substantially rectangular as illustrated. In other embodiments, opening 140 can have other suitable shapes.

Figure 9:
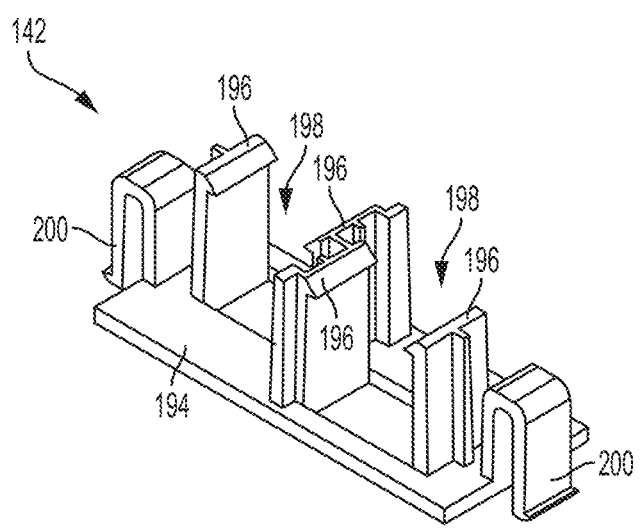
FIG. 9 is a perspective view of a connector holder of an assembly for deploying fiber optic cable, according to an embodiment.
Figure 10:
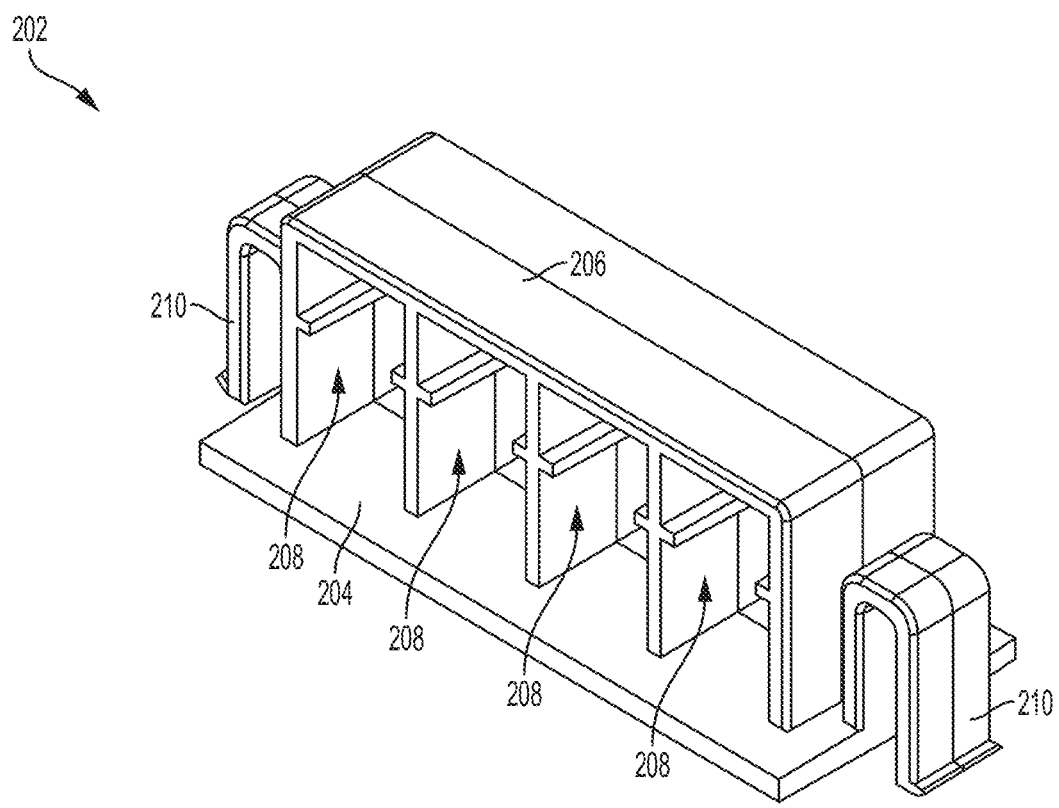
FIG. 10 is a perspective view of another connector holder of an assembly for deploying fiber optic cable, according to an embodiment.
Figure 11:
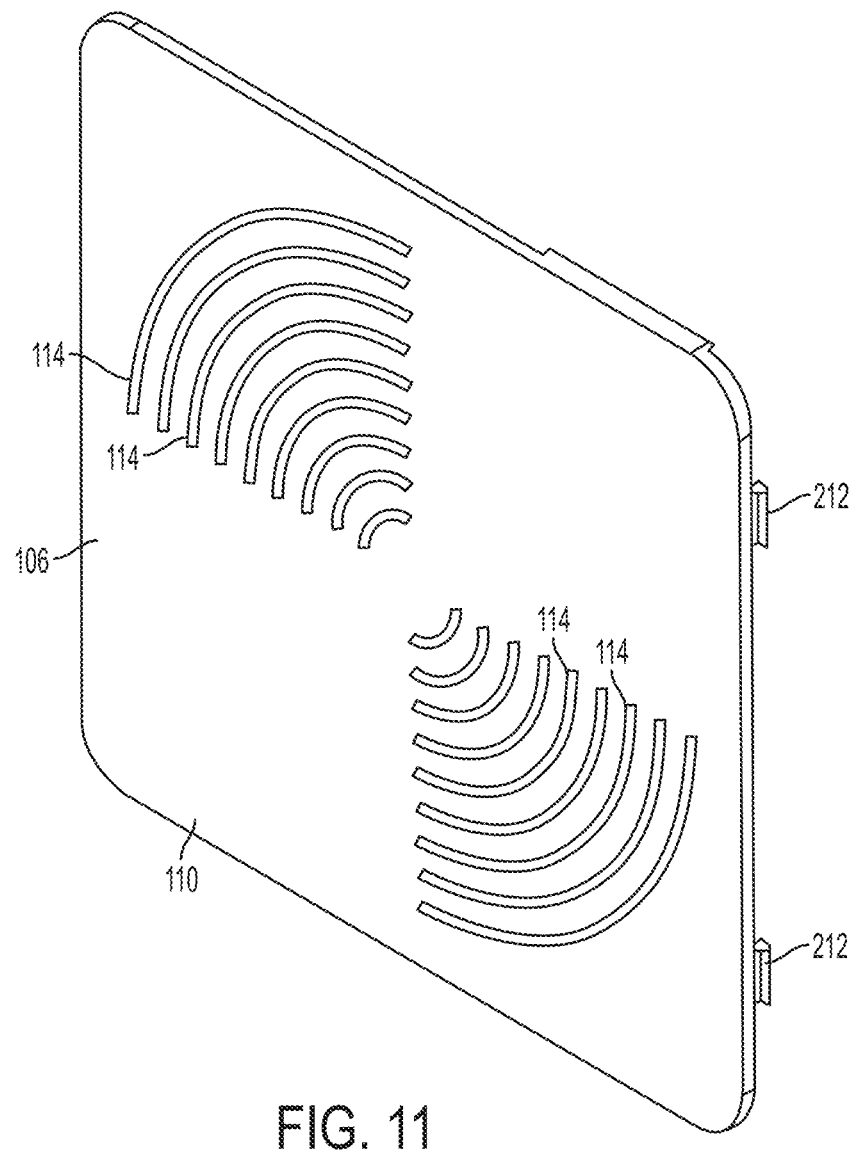
FIG. 11 is a front perspective view of a cover of an assembly for deploying fiber optic cable, according to an embodiment.

In some embodiments, the connector holder configured to mate with opening 140 can be either a two connector holder 142 (as shown in FIG. 9) or a four connector holder 202 (as shown in FIG. 10). Connector holders 142 and 202 are each configured to securely and releasably retain the pre-terminated connectorized ends of fiber optic cables 180 stored on spool 108. Embodiments of connector holders 142 and 202 are explained in more detail below.

Figure 6:
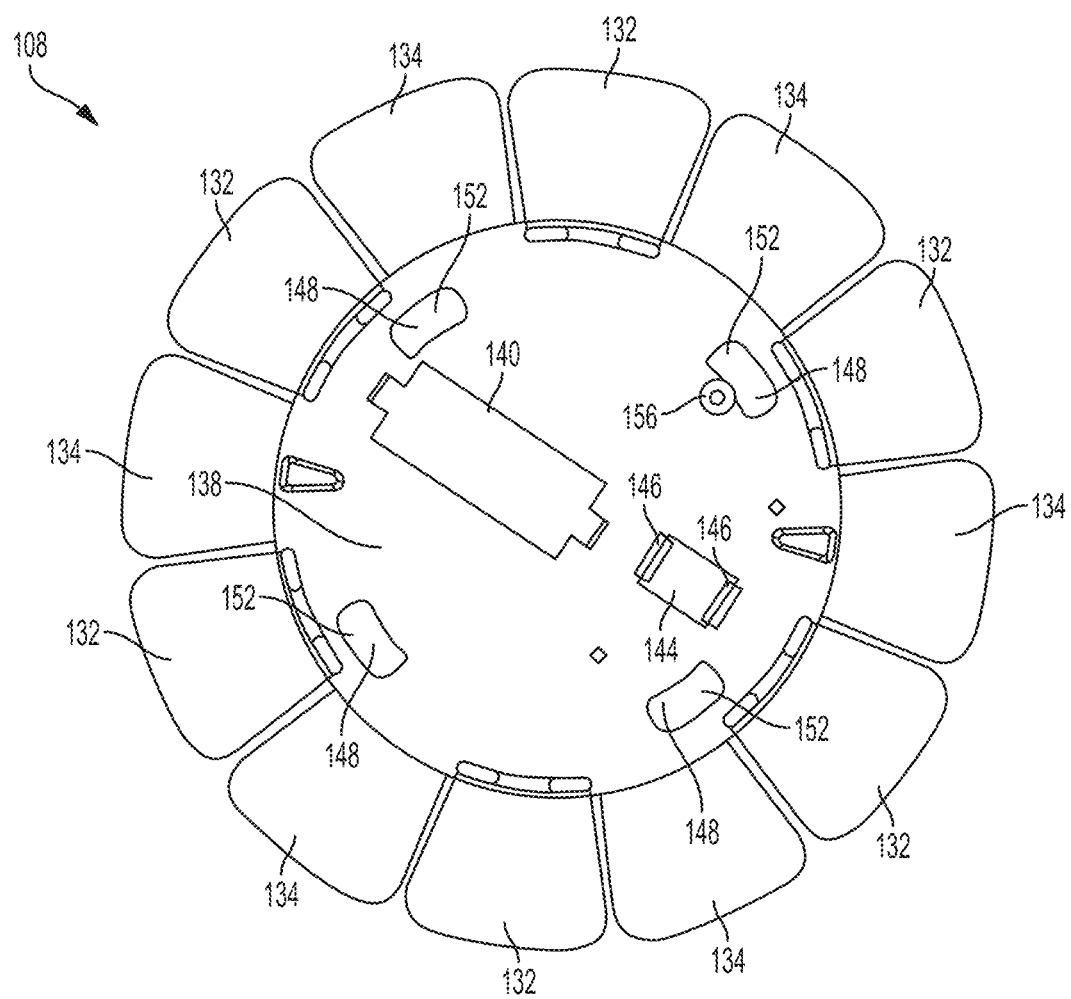
FIG. 6 is a top view of a spool of an assembly for deploying fiber optic cable, according to an embodiment.

As best seen in FIGS. 4 and 6, panel 138 can also include a fan out retaining structure 144 configured to securely and releasably retain a fan out (not shown) that separates fibers of fiber optic cable 180. In some embodiments, fan out retaining structure 144 includes a pair of retaining prongs 146 that are configured to cooperatively engage the fan out. In some embodiments, fan out retaining structure 144 is radially aligned with the major axis of rectangular opening 140. In some embodiments, the fan out coupled to retaining structure 144 is coupled to at least one end of fiber optic cable 180 and separates each fiber of fiber optic cable 180. The fan out can help prevent the mingling and bundling of loose fibers of fiber optic cable 180. The fan out can also allow the fibers of the fiber optic cable 180 to be terminated without splicing, and without needing a protective enclosure.

In some embodiments, panel 138 also includes one or more cable guides 148. For example, as shown in FIGS. 2, 4, and 6, panel 138 includes four cable guides 148 that are equally spaced about the rotational axis of spool 108. Cable guides 148 are configured to efficiently route a portion of fiber optic cable 180 stored on spool 108 around the circumference of panel 138 and to and from the various components on panel 138. In some embodiments, each cable guide 148 includes a first portion 150 that extends perpendicularly from panel 138 and a second portion 152 that extends perpendicularly and outward from first portion 150. First and second portions 150 and 152 of cable guides 148 (along with retaining tabs 132) define a channel 154 through which a portion of fiber optic cable 180 can pass.

In some embodiments, spool 108 also includes a handle 156 configured to allow a user to easily rotate spool 108 relative to housing 102. As shown in FIGS. 2, 4, and 6, handle 156 can be cylindrical post extending perpendicularly from panel 138 in some embodiments. Handle 156 can have other suitable shapes and configuration in other embodiments. Handle 156 can help a user to easily manipulate spool 108 while reeling in or paying out fiber optic cable 180.

Exemplary Connector Holders

FIGS. 9 and 10 illustrate two embodiments of connector holders 142 and 202, respectively, configured to be selectively coupled to panel 138 of spool 108 at opening 140. Each of connector holders 142 and 202 can be configured to releasably secure one or more end portions 184 of fiber optic cables 180, for example, one or more pre-terminated fiber connectors 186. For example, whenever connectors 186 are not in use or not connected with a respective fiber adapter 172, the unused connectors 186 can be secured to spool 108 via connector holder 142 or 202.

Referring to FIG. 9, connector holder 142 is configured to releasably and securely retain two connectors 186 of fiber optic cable 180. Connector holder 142 includes a housing 194. Housing 194 can be planar and rectangular, as shown in FIG. 9. Connector holder 142 can also include a plurality of retaining prongs 196 extending substantially perpendicular from housing 194. Prongs 196 define channels 198 configured to closely receive connectors 186 of fiber optic cables 180. Connector holder 142 can also have one or more retaining prongs 200 that are configured to cooperatively engage the edges of panel 138 of spool 108 that define opening 140 to create a press or snap fit that couples connector holder 142 to spool 108. In some embodiments, connector holder 142 is configured to be used with SC connectors. In other embodiments, connector holder 142 is configured to be used LC connectors or other suitable types of connectors.

Referring to FIG. 10, connector holder 202 is configured to releasably and securely retain four connectors of fiber optic cables 180. Connector holder 202 includes a housing 204. Housing 204 can be planar and rectangular, as shown in FIG. 10. Connector holder 202 can also include a retaining structure 206 extending substantially perpendicular from housing 204. Retaining structure 206 defines channels 208 configured to closely receive connectors 186 of fiber optic cables 180. Connector holder 202 can also have one or more retaining prongs 210 that are configured to cooperatively engage the edges of panel 138 of spool 108 that define opening 140 to create a press or snap fit that couples connector holder 202 to spool 108. In some embodiments, connector holder 202 is configured to be used with LC connectors.

Exemplary Component Modules

Embodiments of component module 104 will be described with collective reference to FIGS. 1, 2, 7 and 8.

Component module 104 is configured to be releasably coupled to housing 102 and configured to retain one or more adapters 172 that optically couple with the pre-terminated connectorized ends 186 of the fiber optic cables 180 stored on spool 108 to one or more connectorized ends of jumper fiber optic cables optically coupled to a subscriber end-user fiber optic device, for example, an optical network terminal, located within an end-user's location.

In some embodiments, the one or more adapters 172 can be SC adapters, LC adapters, or a combination of SC and LC adapters. In some embodiments, adapters 172 can be 1×SC simplex adapters, 1×LC duplex adapters, 2×SC simplex adapters, 2×LC duplex adapters, or any combination thereof. In other embodiments, adapters 172 can be adapters other than SC or LC adapters.

Figure 7:
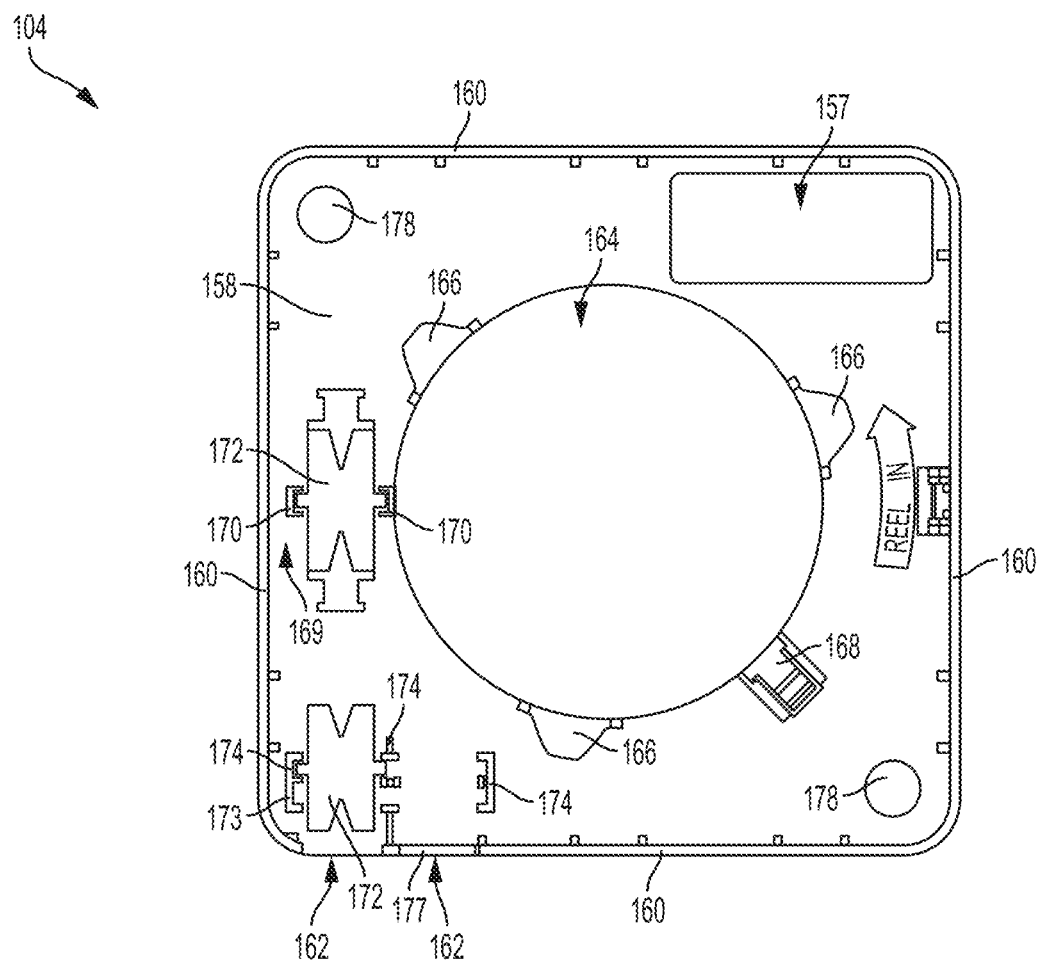
FIG. 7 is a front view of a component module and a housing of an assembly for deploying fiber optic cable, according to an embodiment.

Component module 104 can define a cavity 157 configured to store at least one or more components such as fiber optic components, for example, one or more adapters 172 and/or electrical components. Component module 104 can include a panel 158 (which can be a back wall of component module 104). Panel 158 can be substantially square and planar as shown in FIGS. 2, 7, and 8. In other embodiments, panel 158 can have other suitable shapes. In some embodiments, the shape of panel 158 closely corresponds to the shape of panel 118 of housing 102. Component module 104 can also include walls 160 extending substantially perpendicular from the perimeter of panel 158. Walls 160 can be exterior side walls of component module 104 as shown in FIGS. 1, 2, 7, and 8, in some embodiments. In some embodiments, walls 160 extend around substantially the entire perimeter of panel 158 as shown in FIGS. 1, 2, 7, and 8. In other embodiments, walls 160 extend around only a portion or portions of the perimeter of panel 158. Panel 158 and walls 160 can collectively define cavity 157 of component module 104.

Walls 160 can define one or more openings 162 configured to allow access to one or more fiber optic cables within assembly 100, for example, via adapters 172. In some embodiments, as best seen in FIGS. 7 and 8, two openings 162 can be defined on a single wall 160. In some embodiments (not shown), walls 160 can define one or more openings 162 on any of walls 160.

Panel 158 can define an opening 164 that provides access to spool 108 (and particularly, to panel 138 of spool 108) rotatably mounted to housing 102. In some embodiments, opening 164 has a circular shape that closely corresponds to the circular shape of panel 138 of spool 108. Opening 164 is positioned on component module 104 such that when component module 104 is releasably coupled to housing 102, opening 164 is aligned with panel 138 of spool 108.

In some embodiments, component module 104 includes a plurality of cable guides 166 configured to guide portions of fiber optic cables along component module 104. In some embodiments, cable guides 166 extend from the perimeter of opening 164 defined by panel 158. In some embodiments, component module 104 includes three cable guides equally spaced about the center of opening 164.

Component module 104 can also include a lock 168 configured to selectively stop rotation of spool 108 relative to housing 102 at a fixed position. Locking spool 108 can prevent undesirable pay-out of fiber optic cable 180. For example, lock 168 can be a slidable or rotatable latch that engages a groove or opening on spool (for example, a groove or opening defined by retaining tabs 132 of spool 108) to stop rotation of spool 108. In other embodiments, lock 168 can be a screw lock, a bolt lock, or a knob lock, or any other suitable lock to stop rotation of spool 108.

Component module 104 can include one or more first adapter retaining structures 169 configured to securely and releasably retain one or more adapters 172. Each adapter retaining structure 169 can be configured to optically couple the connectorized ends 186 of fiber optic cable 180 stored on spool 108 to one or more connectorized ends of a drop fiber optic cable optically coupled to an end-user fiber optic device, for example, an optical network terminal, located within an end-user's location. In some embodiments, first adapter retaining structure 169 can include a pair of posts 174 that are configured to cooperatively engage adapter 172. Each posts 174 can define a channel configured to receive a respective groove on adapter 172 such that adapter 172 slides relative to posts 174.

Component module 104 can also include one or more second adapter retaining structure 173 configured to securely and releasably retain one or more adapters 172 at a position accessible to a user from openings 162. For example, adapter retaining structure 173 can be adjacent openings 162 defined by walls 160. Adapter retaining structure 173 can be configured to retain one or more adapters 172 that correspond to the number of openings 162. In some embodiments, second adapter retaining structure 173 includes three posts 174 that are configured to cooperatively engage two adapters 172. Each posts 174 can define a channel configured to receive a respective groove on adapter 172 such that adapter 172 slides relative to posts 174.

In some embodiments, component module 104 includes a rubber grommet 176 (shown in FIG. 8) that is configured to seal an opening 162 defined by walls 160 of component module 104. Rubber grommet 176 can define one or more channels allowing a fiber optic cable to pass from within the assembly 100 to outside of assembly 100.

In some embodiments, component module 104 includes a solid cover 177 configured to close an opening 162 defined by walls 160 of component module 104. In some embodiments, cover 177 is a punch out cover that allows a user to selectively remove cover 177 to create opening 162 as per the requirement of the number of subscriber connections and the network terminal. In other embodiments, cover 177 is slidable or rotatably coupled to walls 160.

In some embodiments, panel 158 of component module 104 defines one or more openings 178 configured to allow a fastener to pass through. In some embodiments, openings 178 are aligned with fastener channels 126 on housing 102. Openings 178 can be positioned in the corners of component module 104 in some embodiments.

Referring to FIG. 2, the outer surface of component module 104 can include one or more grooves 121 configured to cooperatively engage with prongs 112 of housing 102 to releasably couple component module 104 to housing 102.

Component module 104 can be configured such that component module 104 can be releasable coupled to housing 102 in at least two different orientations relative to housing 102 based on the requirement of fiber optic cable 180, the desired orientation of openings 162, or the position of adapter 172 on panel 158. For example, component module 104 is configured such that component module 104 can be releasable coupled to housing 102 at four different orientations relative to housing 102. FIG. 8 illustrates component module 104 coupled to housing 102 at a first orientation at which openings 162 face downward. But component module 104 can also be releasable coupled to housing 102 at three other orientations relative to housing 102 such that openings 162 face to the right, left, and up.

In some embodiments, releasably coupling component module 104 to housing 102 secures spool 108 within cavity 119 defined by housing 102, while spool 108 can freely rotate within cavity 119. In some embodiments, spool 108 is positioned between component module 104 and housing 102, and at least a portion (for example, a portion of panel 158) overlaps with a portion of spool 108 (for example, a portion of tabs 132) in the direction of the axis of rotation of spool 108. This overlap can secure spool 108 within cavity 119.

In some embodiments, assembly 100 includes two or more component modules 104 that can be releasably coupled to each other, for example, in stackable in series. In some multi-component-module embodiments, one component module 104 includes adapter 172, and one component module 104 includes an electronic component 282 (embodiments of which are described further below). In some multi-component-module embodiments, one component module 104 includes both an adapter 172 and electronic component 282, and one component module 104 includes both an adapter 172 and an electronic component 282 (embodiments of which are described further below)

Exemplary Covers

Assembly 100 can also optionally include a cover 106. Embodiments of cover 106 will be described with collective reference to FIGS. 1, 2, 11, and 12. Cover 106 can configured to close the opening of cavity 157 defined by component module 104 to protect the components stored in cavity 157 from the outer environment.

In some embodiments, cover 106 is releasably coupled to component module 104 such that the cover 106 can be removed to provide user access to cavity 157 defined by component module 104. In other embodiments, cover 106 is not releasably coupled to component module 104, but is coupled to component module 104 in a movable manner such that the cover can move between an open position and a closed position.

In some embodiments, cover 106 includes a wall 110. Wall 110 can be substantially square and planar as shown in FIGS. 1, 2, 11, and 12. Wall 110 can have a shape that closely corresponds to the shape of panel 158 of component module 104 and panel 118 of housing 102. In other embodiments, wall 110 can have other suitable shapes and be non-planar.

In some embodiments, cover 106 can define a plurality of through slots 114. Slots 114 can provide ventilation to the components stored within assembly 100.

Figure 12:
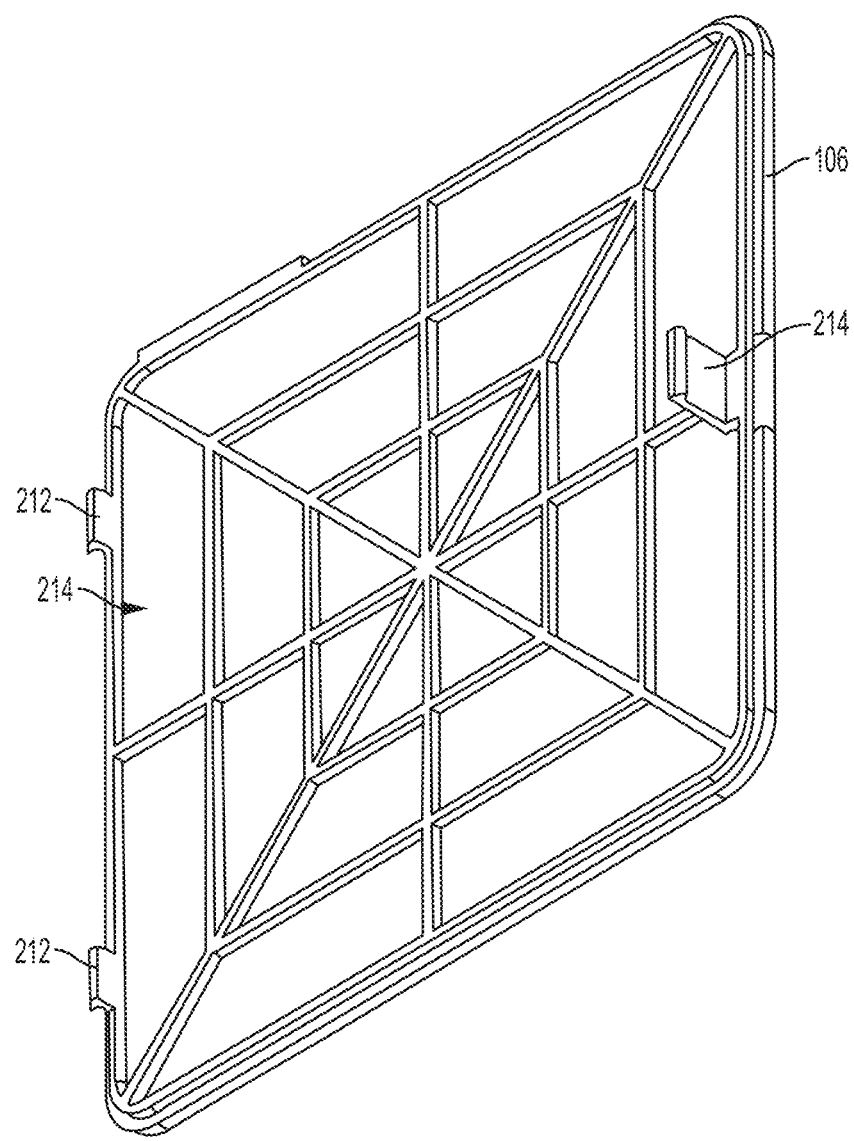
FIG. 12 is a rear perspective view of a cover of an assembly for deploying fiber optic cable, according to an embodiment.

Cover 106 can include one or more retaining prongs to releasably coupled cover 106 to component module 104. For example, cover 106 can include a pair of retaining prongs 212 that extend from wall 110 toward housing 102. Retaining prongs 212 are configured to cooperatively engage grooves defined by component module 104 such that cover 106 is releasably mounted to component module 104. In some embodiments, retaining prongs 212 are located on the same side of cover 106 as shown FIGS. 11 and 12. In other embodiments, retaining prongs 212 can be located on different sides of cover 106. As best seen in FIG. 12, cover 106 can also include another retaining prong 214. Retaining prong 214 extends from wall 110 toward housing 102. Retaining prong 214 is configured to cooperatively engage a respective groove defined by component module 104 such that cover 106 is releasably mounted to component module 104. In some embodiments, retaining prong 214 is located on a side of cover 106 opposite of retaining prongs 212 as shown in FIG. 12. In other embodiments, retaining prong 214 can be located on different side of cover 106. Retaining prong 214 can be longer than retaining prongs 212.

In other embodiments (not shown), cover 106 is rotatably or slidably mounted to component module 104.

Exemplary Electronic Components

Figure 22:
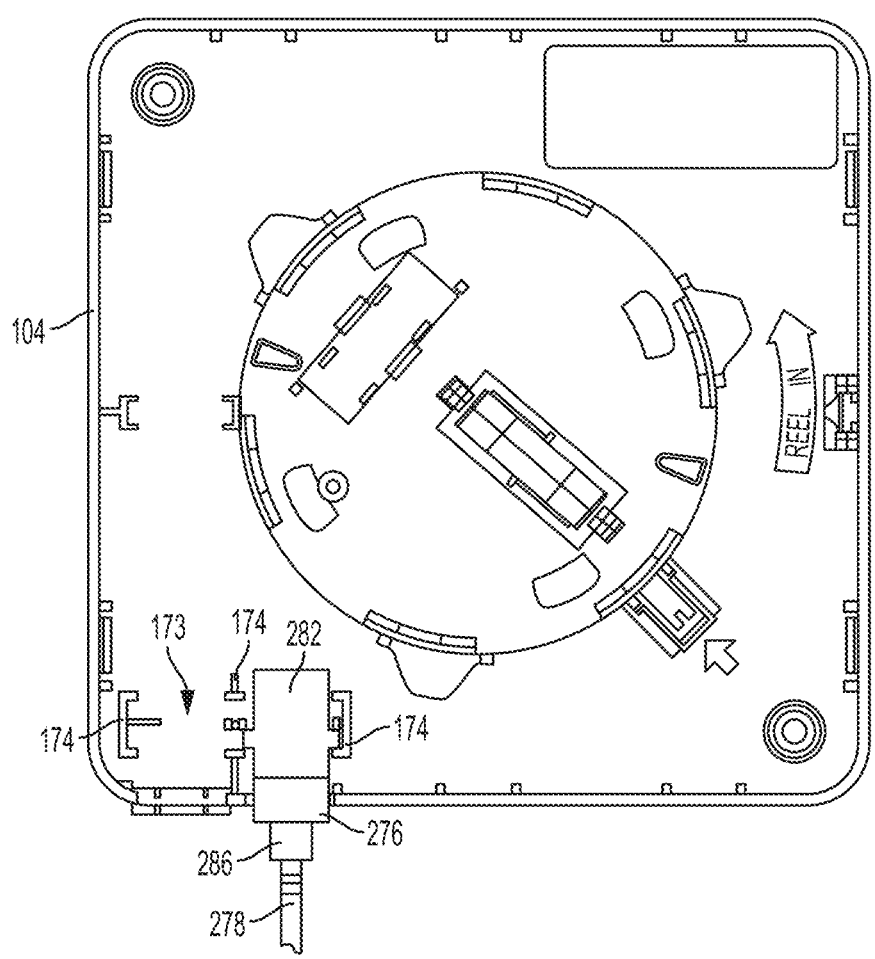
FIG. 22 is a top view of another component module, according to an embodiment.

In some embodiments, assembly 100 can also include one or more electronic components 282. For example, as shown in FIG. 22, assembly 100 can include one electronic component 282. The one or more electronic components 282 can be releasably coupled to component module 104 in some embodiments. For example, in some embodiments, retaining structure 173 can be configured to securely and releasably couple electronic component 282 in addition to adapter 172. In some embodiments, electronic component 282 includes one or more protrusions configured to be slidably received within the one or more channels defined by posts 174 of retaining structure 173.

In some embodiments, electronic component 282 can be, for example, a wireless network component such as an Ethernet switch or an access point for a wireless network, such as Wi-Fi or Bluetooth network access point.

In some embodiments, electronic component 282 can be an optical-to-electrical media converter. In some of such embodiments, the optical-to-electrical media converter can convert an optical signal from fiber optic cable 180 to an electrical signal to be communicated by cable 278. For example, the optical-to-electrical media converter can be optical network terminal.

In some embodiments, electronic component 282 is a microphone, a camera, and/or a phone.

In some embodiments, electronic component 282 is an RFID reader.

In some embodiments, electronic component 282 can by any component used in home alarm or monitoring systems. For example, electronic component 282 can be a smoke detector, a motion detector, a water leak detector, a carbon monoxide detector, video camera, a speaker, or a glass break detector.

In some embodiments, electronic component 282 is an internet of things gateway. For example, electronic component 282 can be a gateway that communicates with, for example, fitness and health monitors, household and business appliances, household and business devices, any other device configured to be connected to the interne.

In some embodiments, electronic component 282 is configured to transmit and receive data using a cable 278. Cable 278 can be an Ethernet cable, a USB cable, or Fire Wire cable, or any other suitable data transmission cable. In some embodiments, electronic component 282 is also configured to be powered by cable 278. For example, electronic component 282 can be powered by power over Ethernet using an Ethernet cable, or electronic component 282 can be powered by USB power delivery using a USB cable.

In some embodiments, electronic component 282 is coupled to cable 278 using a connector 276. In some embodiments, connector 276 is a blind mate connector. In other embodiments, connector 276 is magnetic power connector such that electronic component 282 can be easily detached from connector 276.

In some embodiments, electronic component 282 is optically coupled directly to fiber optic cable 180.

Component module 104 can be configured (i.e., shaped and sized) to house electronic component 282 and adapter 172 at least partially (and, in some embodiments, entirely) within cavity 157 defined by component module 104. In some multi-component-module embodiments, one component module 104 can be configured (i.e., shaped and sized) to house electronic component 282 at least partially (and, in some embodiments, entirely) within cavity 157, and another one component module 104 can be configured (i.e., shaped and sized) to house adapter 172 at least partially (and, in some embodiments, entirely) within cavity 157.

Exemplary Mounting Brackets

Figure 13:
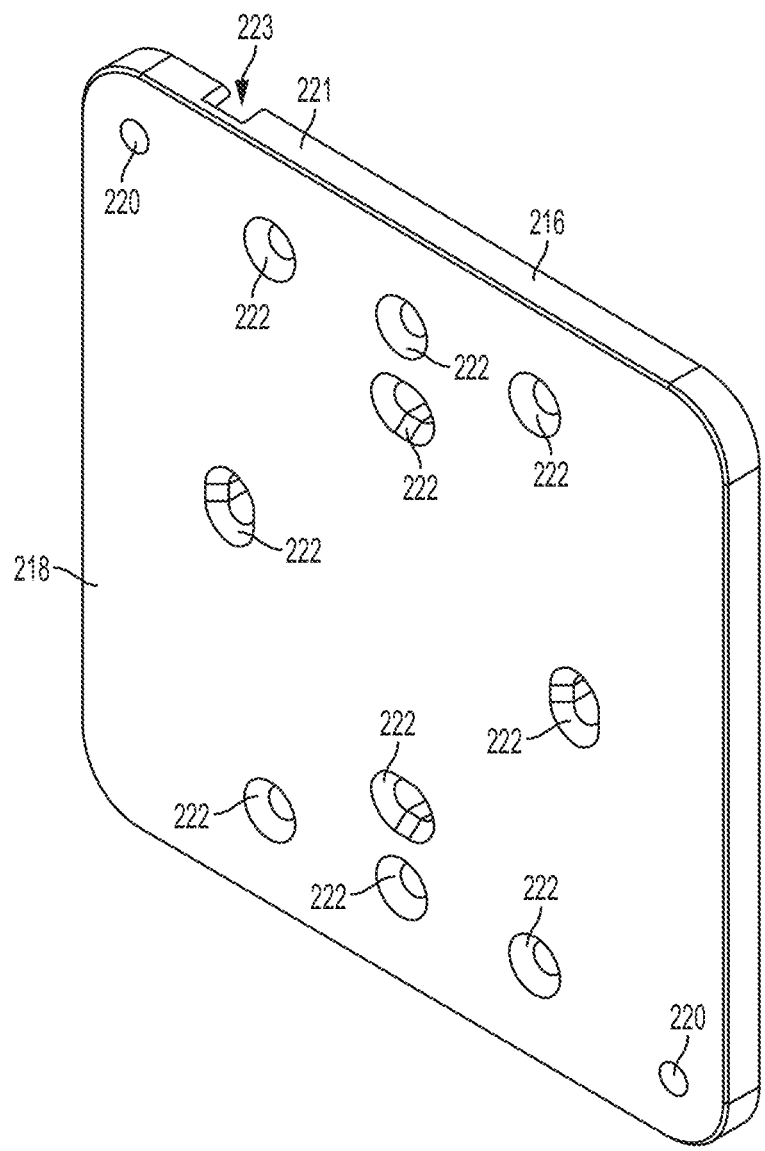
FIG. 13 is a perspective view of a wall mounting bracket, according to an embodiment.

Referring to FIG. 13, in some embodiments, assembly 100 is configured to be mounted to a mounting bracket 216, which in turn is mounted to a mounting surface, for example, a wall (including an electrical gang box on a wall), pole, or shelf.

Wall mounting bracket 216 includes a panel 218. Panel 218 can be substantially square and planar in some embodiments, as shown in FIG. 13. In other embodiments, panel 218 can have other suitable shapes or be non-planar.

Panel 218 can define a plurality of opening 222 configured to receive fasteners to secure bracket 216 to the mounting surface. For example, in some embodiments, the pattern of openings 222 corresponds to the pattern of known fastener receiving openings of electrical gang boxes or other desired mounting surfaces.

Panel 218 can also define a pair of openings 220 configured to receive fasteners passing through channels 126 of housing 102 and openings 178 of component module 104. These fasteners can engage the surfaces defining opening 220 of bracket 216 to secure assembly 100 to bracket 216 and, thus, to the mounting surface to which bracket 216 is coupled.

In some embodiments, bracket 216 includes at least one wall 221 extending from panel 218. Wall 221 spaces panel 218 away from the mounting surface. Wall 221 can define an opening 223. An installer can route cable portion 182 extending from opening 120 of housing 102 through opening 223 towards the mounting surface, for example, into an electrical gang box or through an opening defined in a wall mounting surface.

In some embodiments, the installer can route cable portion 182 extending from opening 120 into a surface raceway before or after mounting assembly 100 to bracket 216.

Exemplary Mounting Cradles

Figure 14:
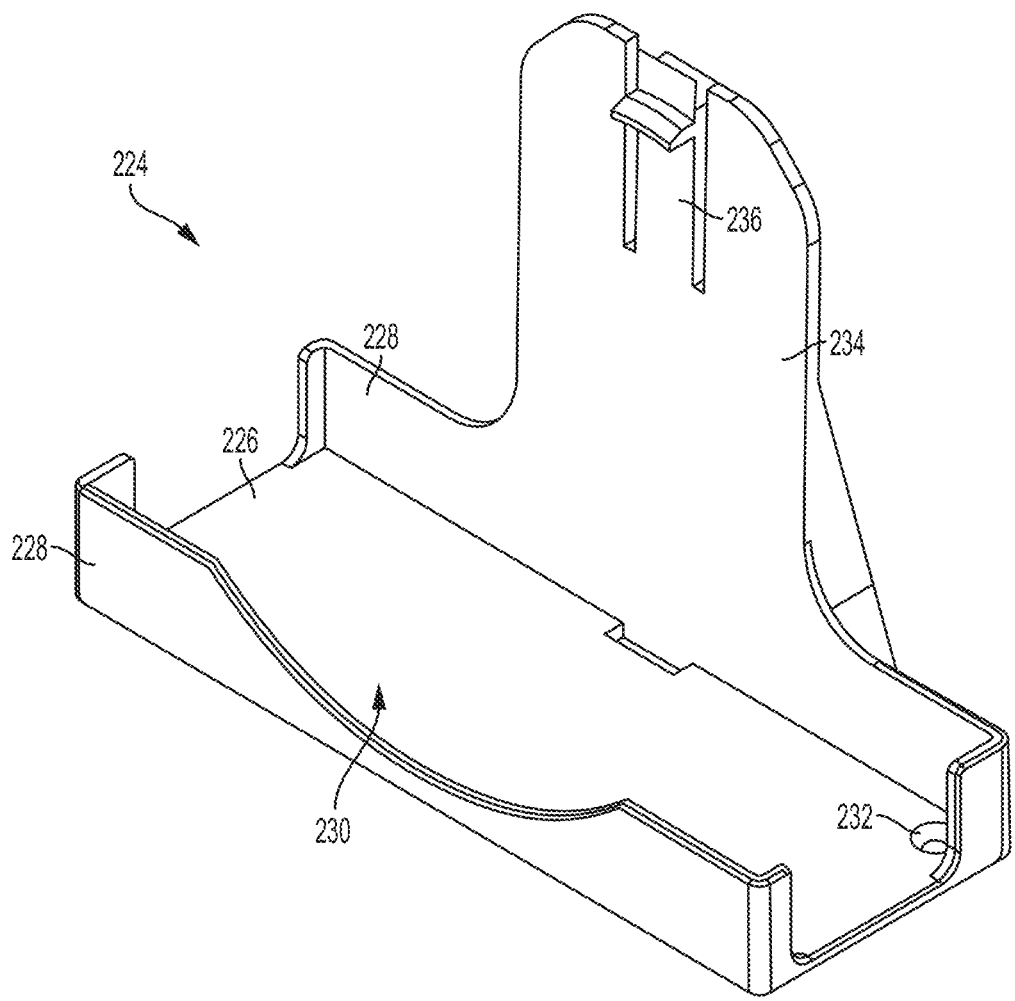
FIG. 14 is a perspective view of a cradle, according to an embodiment.

Embodiments of a mounting cradle 224 will be described with collective reference to FIGS. 14 and 15. In some embodiments, assembly 100 is configured to be mounted to a cradle 224. Cradle 224 can be configured to be positioned on a horizontal mounting surface such as a desk top or cabinet shelf top or on a vertical surface such as a wall or a vertical shelf panel.

Cradle 224 can define a cavity 230 configured to closely receive at least a portion of assembly 100. In some embodiments, cradle 224 can include a housing 226. Housing 226 can be substantially rectangular and planar as shown in FIG. 14. A planar housing 226 allows cradle 224 to be easily positioned on a planar horizontal surface such as a desk top, cabinet shelf, or cabinet top, without falling over. In other embodiments, housing 226 can have other suitable shapes or be non-planar. Cradle 224 can also include walls 228 extending substantially perpendicular to housing 226 along the perimeter of housing 226. Walls 228 and housing 226 can collectively define cavity 230.

In some embodiments, cradle 224 also includes a projection 234 extending from an upper portion of a wall 228 and away from housing 226. Projection 234 can provide support to assembly 100 by preventing assembly 100 from rotating relative to housing 226. In some embodiments, projection 234 includes a retaining prong 236 configured to cooperatively engage a corresponding retaining groove on a surface of assembly 100, for example, a back surface of assembly 100 to releasably couple assembly 100 to cradle 224.

In some embodiments, cradle 224 is configured to be fixedly secured to the mounting surface. For example, housing 226 can define an opening 232 configured to receive a fastener to fixedly secure cradle 224 to the mounting service.

Figure 15:
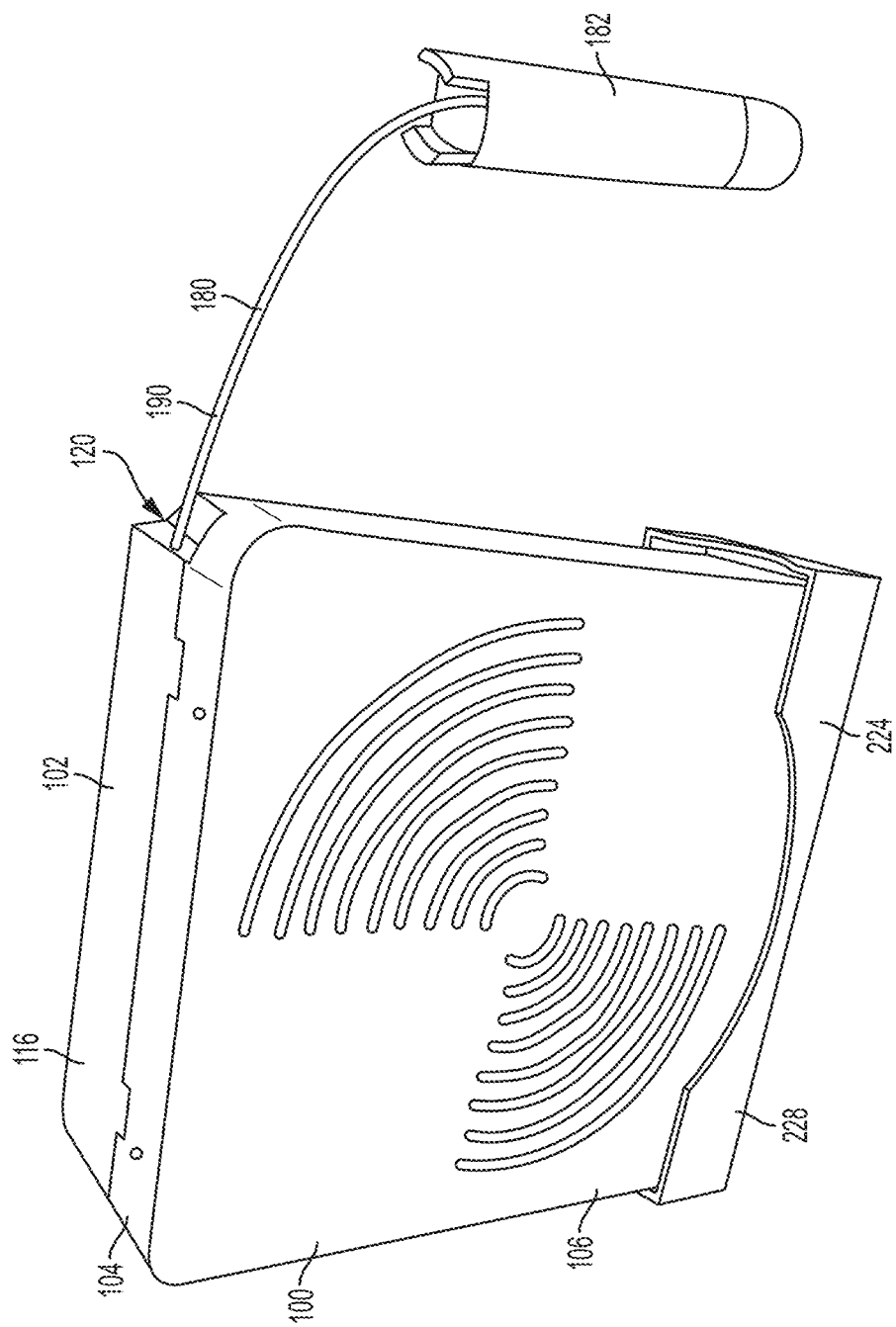
FIG. 15 is a perspective view of an assembly for deploying fiber optic cable coupled to a cradle, according to an embodiment.

FIG. 15 illustrates a portion of assembly 100 seated within cavity 230 of cradle 224. At this configuration, assembly 100 is releasably coupled to cradle 224, which can be positioned on any suitable mounting surface.

Also illustrated in FIG. 15 is a portion of fiber optic cable 180, including first end portion 182, exiting assembly 100 through opening 120 defined by walls 116 of housing 102.

Exemplary Stud Mounting Assemblies

Embodiments of an assembly for mounting assembly 100 to studs within a wall will be described with collective reference to FIGS. 16-19.

Figure 16:
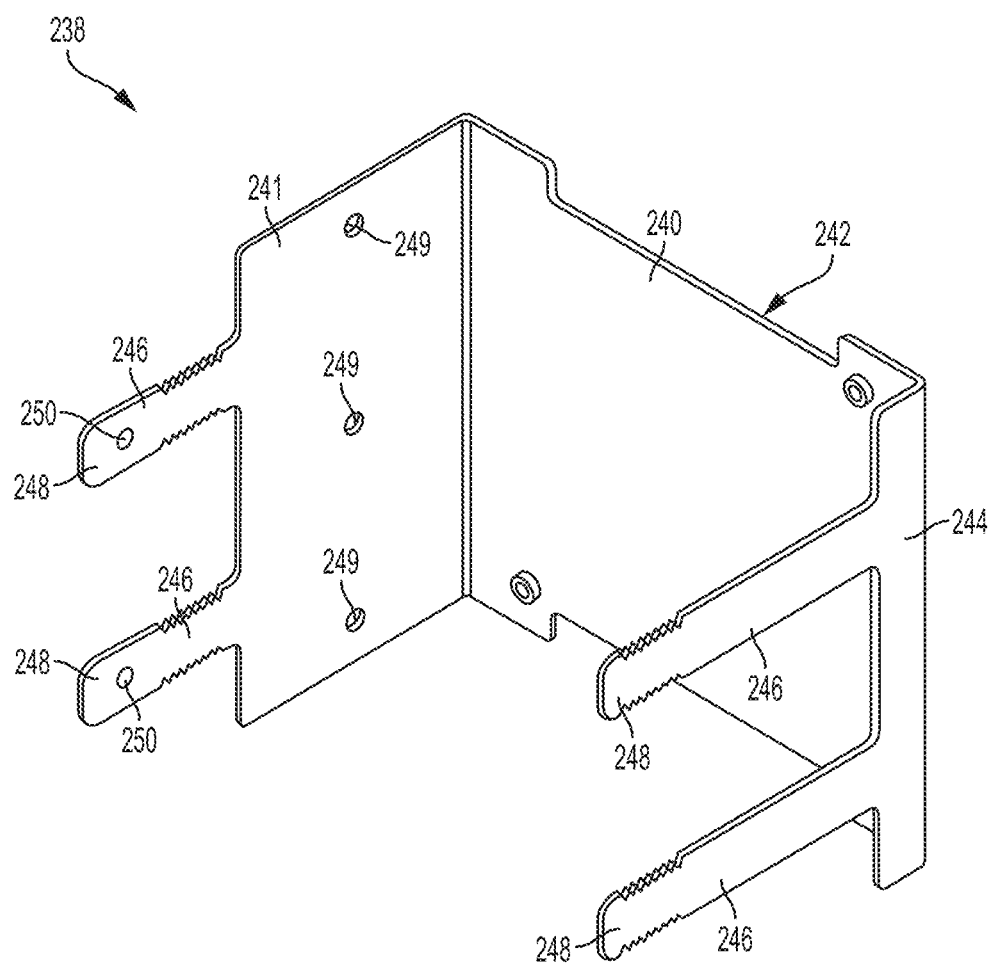
FIG. 16 is a perspective view of a stud mounting bracket, according to an embodiment.

In some embodiments, the stud mounting assembly can include a stud mounting bracket 238 configured to be fixedly coupled to a stud within a wall. Bracket 238 can include a panel 240. In some embodiment, as shown in FIG. 16, panel 24 is substantially rectangular and planar. Extending substantially perpendicular from one edge of panel 242 is a side panel 241, and extending substantially perpendicular from the opposing edge of panel 242 is side panel 244. In some embodiments, panel 241 defines a plurality of openings 249 configured to allow a fastener (e.g., a nail, a screw, or a bolt) to pass there through and fixedly secure bracket 238 to the stud.

Figure 19:
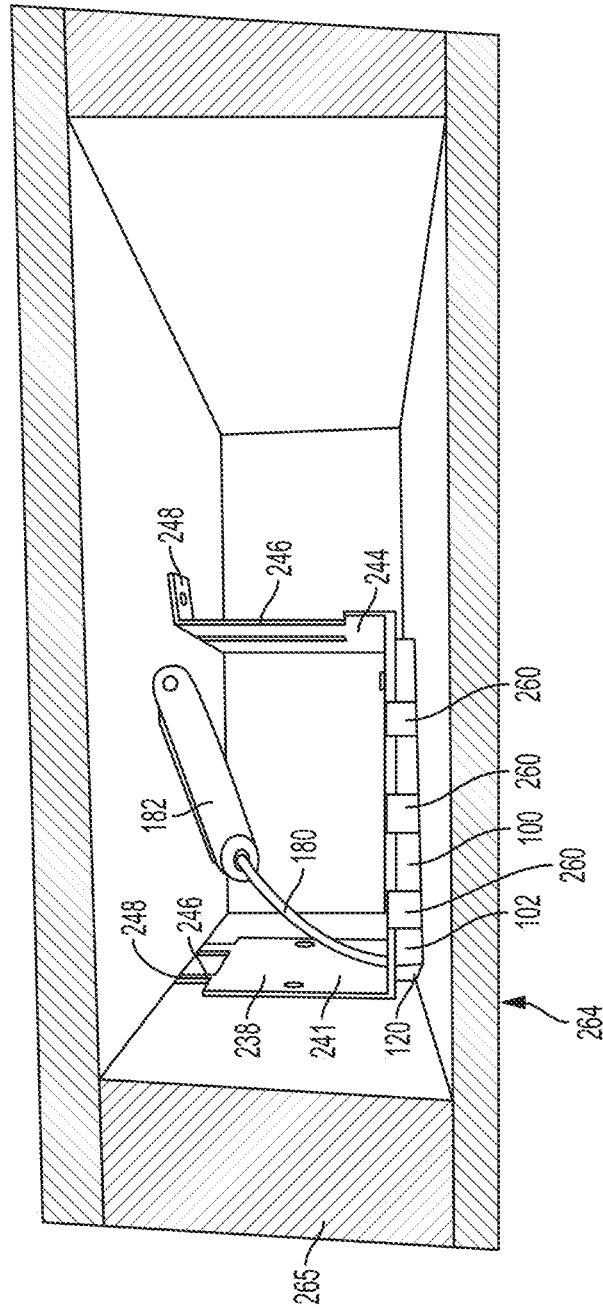
FIG. 19 is a cross-sectional view of a wall with an assembly for deploying fiber optic cable coupled to a stud mounting bracket and faceplate, according to an embodiment.

In some embodiments, bracket 238 includes one or more prongs 246 extending from the edges of side panels 241 and 244. Prongs 246 are configured to provide additional points of attachment to either the stud or an adjacent wall surface as shown in FIG. 19. Each of prongs 246 can include a distal end portion 248 that can be bent to form an about 90 degree angle relative to the reminder portion of prong 246, as shown in FIG. 19. The distal ends 248 can include openings 250 configured to receive fasteners that fasten prongs 246 to either a stud 265 or another portion the rear wall surface.

Figure 17:
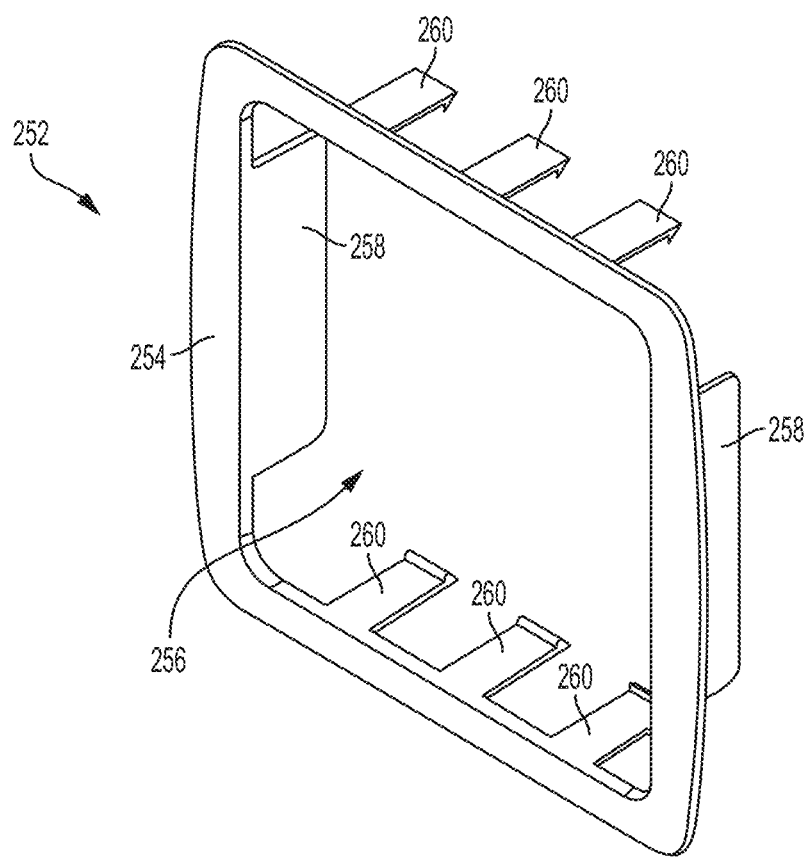
FIG. 17 is a perspective view of a face plate for use with a stud mounting bracket, according to an embodiment.
Figure 18:
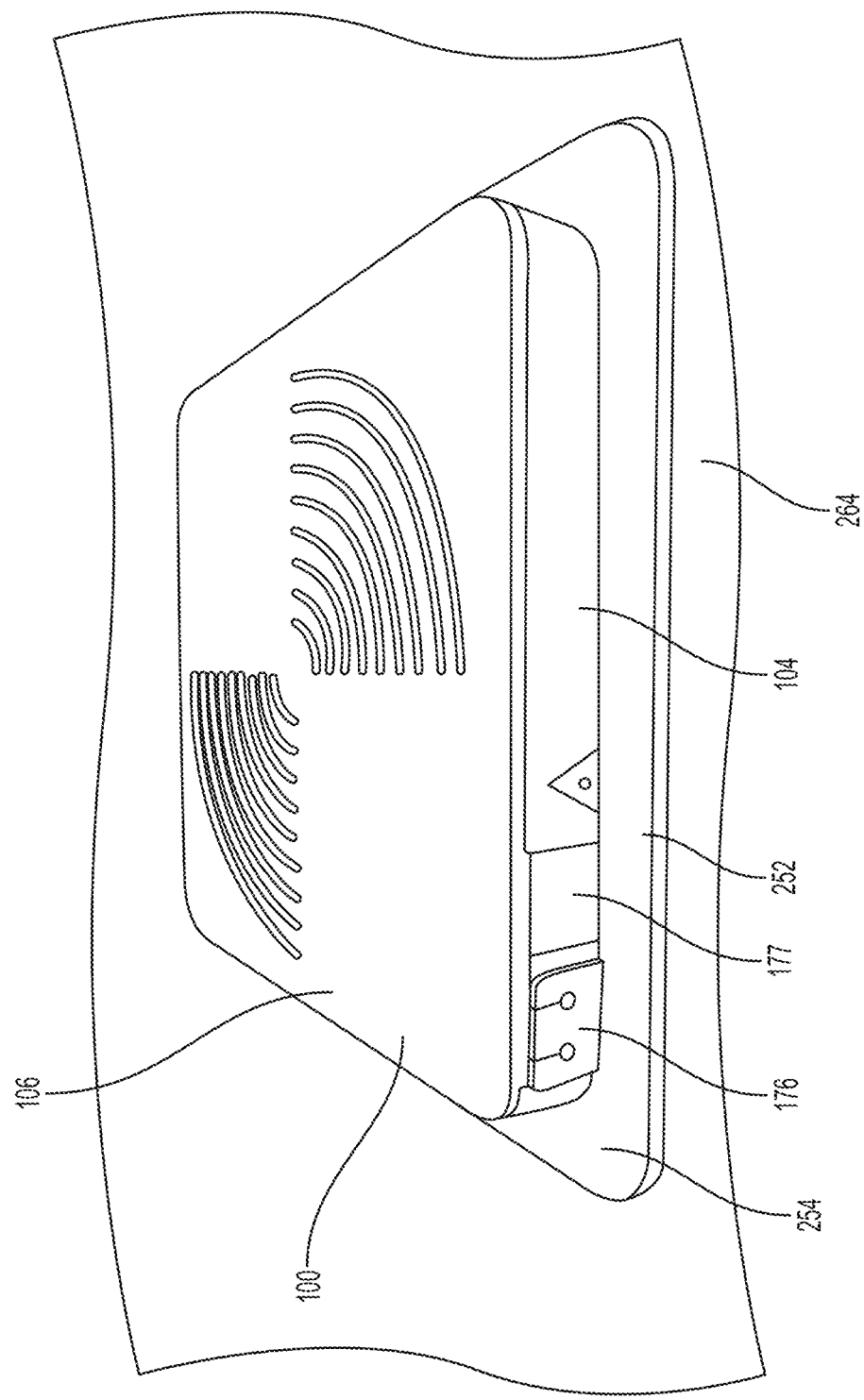
FIG. 18 is a perspective e view of an assembly for deploying fiber optic cable coupled to a stud mounting bracket and faceplate, according to an embodiment.

The stud mounting assembly can also include a mounting surface bracket 252 as shown in FIG. 17. Mounting surface bracket 252 is configured to be inserted in a hole of a mounting surface 264, for example, a sheet rock wall surface, and coupled to stud mounting bracket 238. For example, as best seen in FIG. 19, mounting surface bracket 252 can include one or more retaining prongs 260 configured to create a snap fit with panel 240 of stud mounting bracket 238. Mounting surface bracket 252 can define an opening 256 that closely receives a portion of assembly 100 as shown in FIG. 18. Mounting surface bracket 252 can also include a flange 254 configured to mount flush against mounting surface 264.

In some embodiments, as collectively shown in FIGS. 18 and 19, assembly 100 and the stud mounting assembly are configured such that opening 120 of housing 102 is positioned in the wall cavity, while opening 162 is positioned at the face of the wall, allowing using access to an adapter 172 or electronic module 282 positioned adjacent opening 162.

Exemplary Wall Mounting Assemblies

Figure 20:
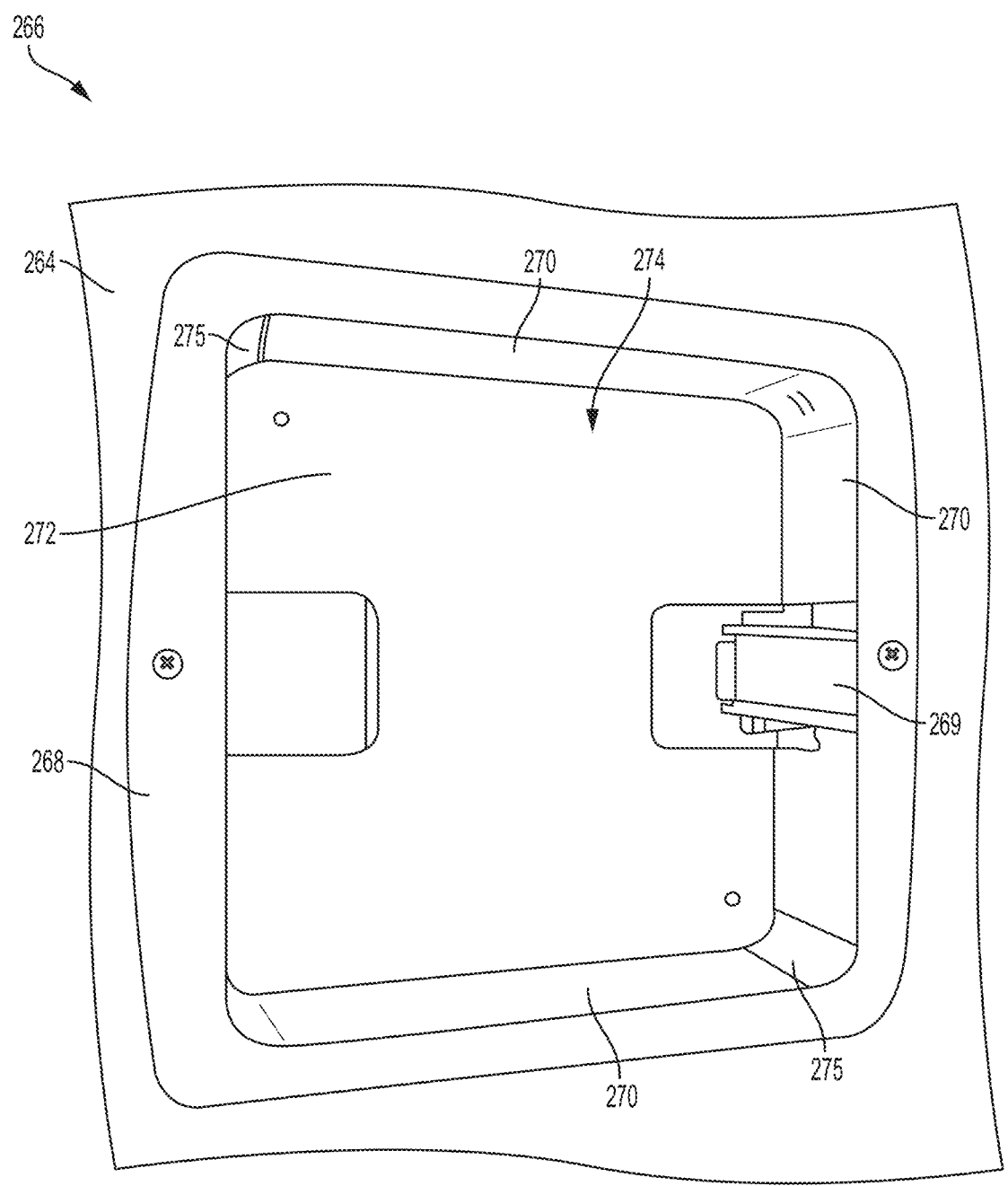
FIG. 20 is a perspective view of another wall mounting bracket, according to an embodiment.
Figure 21:
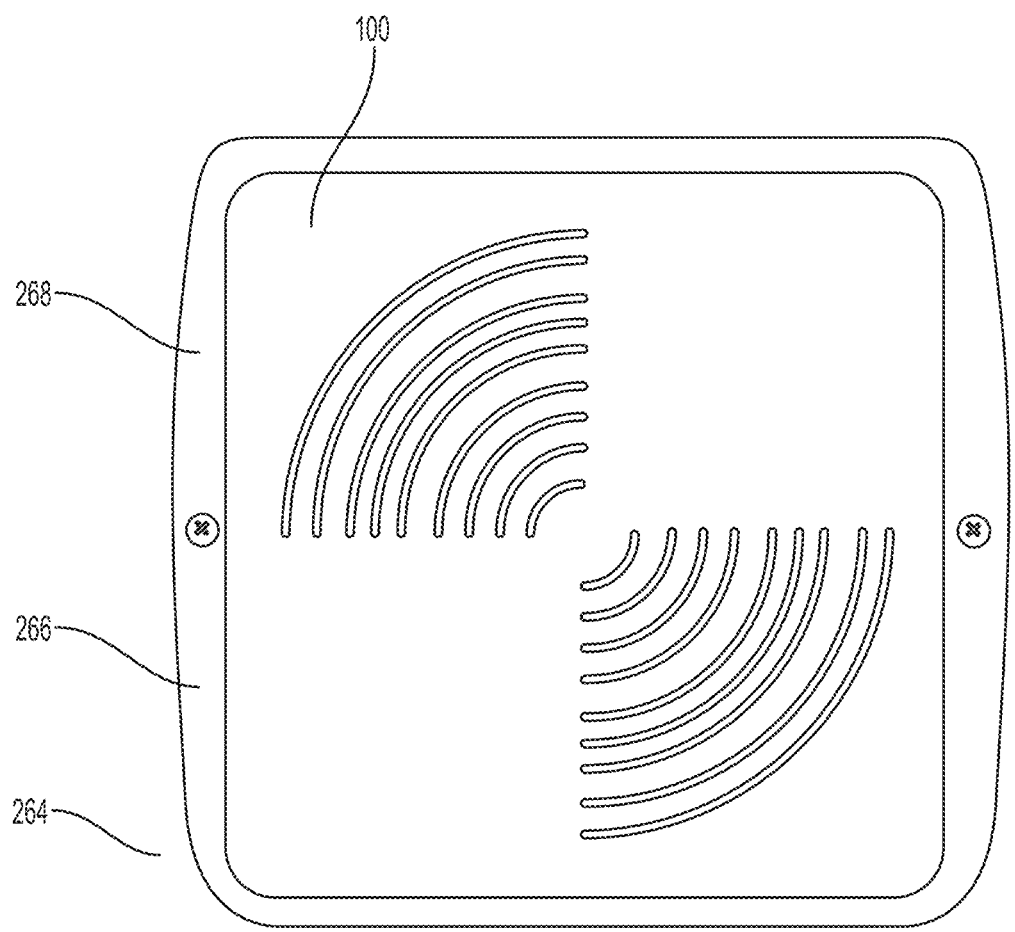
FIG. 21 is a perspective view of an assembly for deploying fiber optic cable coupled to a stud mounting bracket and faceplate, according to an embodiment.

Embodiments of an assembly for mounting assembly 100 to position on a wall that is not next to studs with collective reference to FIGS. 20 and 21.

The hollow wall mounting assembly can include a wall mounting bracket 266 configured to be fixedly coupled to mounting surface 264. Bracket 266 can include a panel 272 and walls 270 extending from the perimeter of panel 272. Panel 272 and walls 270 can collectively define a cavity 274 configured to closely receive a portion of assembly 100. In some embodiments, cavity 274 is configured (i.e., shaped and sized) to create a friction fit or a snap fit with assembly 100. In some embodiment, as shown in FIG. 20, panel 272 is substantially square and planar. In some embodiments, walls 270 define or more openings 275. For example, as shown in FIG. 20, walls 270 define two openings 275. Openings 275 allow an end portion 182 of fiber optic cable 180 to be passed into the wall cavity defined, in part, by mounting surface 264.

Bracket 266 can also include a flange 268 configured to mount flush against mounting surface 264. Bracket 266 can also include one or more anchors 269 configured to couple bracket 266 to any wall surface. Anchors 269 can be, for example, elongated arms that extend outward from walls 270 to clamp the wall between the elongated arms and flange 268.

Exemplary Cable Routing & Component Configurations

Embodiments of cable routing will be described with reference to FIGS. 7 & 8, which shows a component module 104 coupled to a housing 102 on which spool 108 is rotatably mounted. In the illustrated embodiment, assembly 100 store one fiber optic cable 180. Fiber optic cable 180 includes a first end portion 182 and a second end portion 184. In some embodiments, at least one of first and second end portions 182 and 184 is connectorized—the end portion includes a connector 186 and optionally a boot 188. Between the two end portions 182 and 184 is an intermediate jacketed portion 190.

Component module 104, spool 108, and housing 102 are collectively configured such that a gap 192 is formed between panel 138 of spool 108 and panel 158 of component module 104. Gap 192 allows a portion of the jacketed portion 190 of cable 180 to pass from cylindrical drum 130 to panel 138 accessible to a user from cavity 157 defined by component module 104.

In some embodiments, a substantially portion of the jacketed portion 190 is stored around cylindrical drum 130 of spool 108. The portion of cable 180 including first end portion 182 can exit assembly 100 through opening 120 defined by walls 116 of housing 102. And the portion of cable 180 that includes second end portion 184 can pass from cylindrical drum 130 of spool 108 to the face of panel 138 through the gap 192. Then this portion of jacketed portion 190 is routed around the periphery of panel 138 through channels 154 defined in part by cable guides 148. And then end portion 184 having a connector 184 can be stored initially at, for example, connector holder 142, as shown in FIG. 8.

Then connector 186 can be decoupled from connector holder 142 and optically coupled to a respective adapter 172 secured by retaining structure 173 on component module 104. In some embodiments, connector 186 is coupled with jacketed portion 190 of fiber cable 180 via a fan out coupled to retaining structure 144.

Exemplary Applications and Methods of Use

Figure 23:
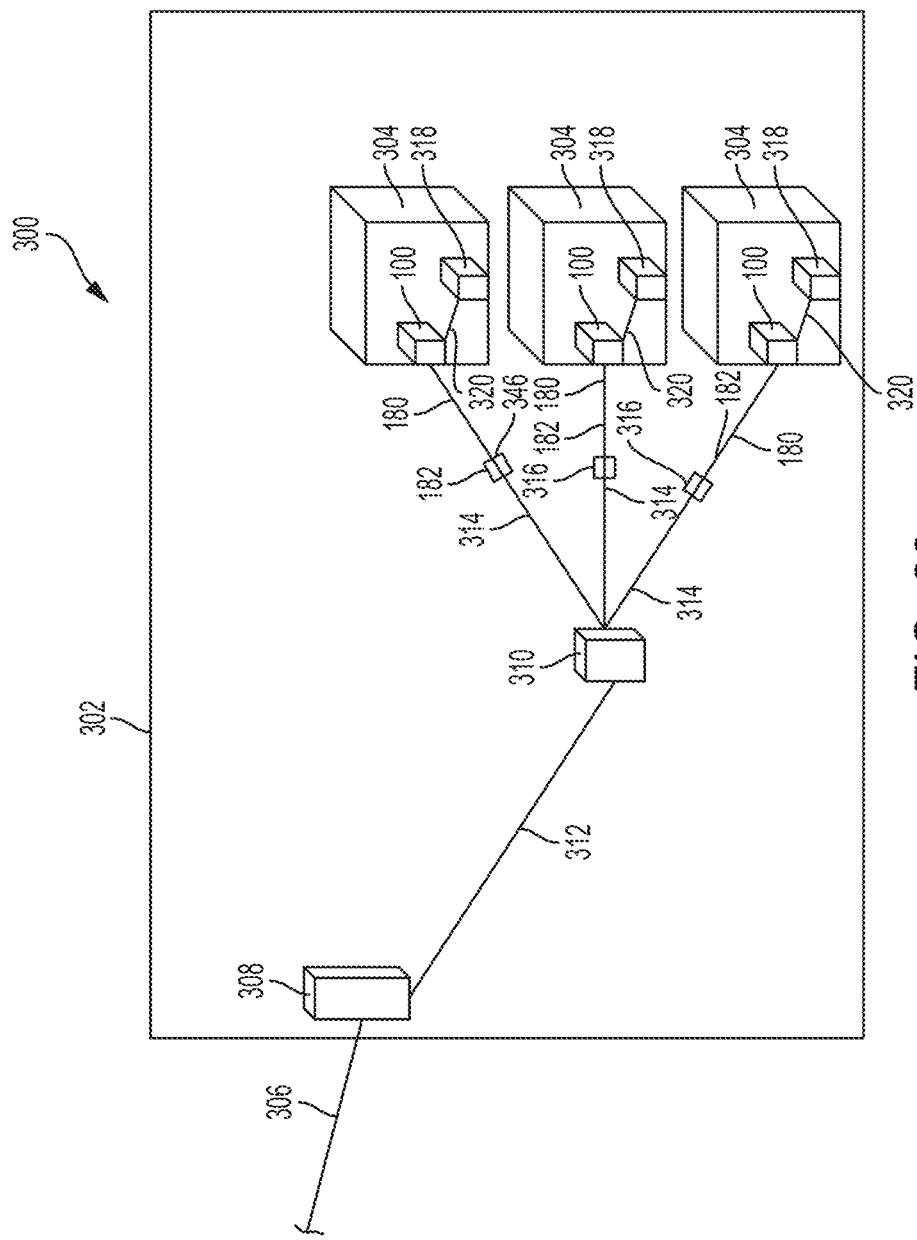
FIG. 23 is a schematic illustration of a fiber distribution system, according to an embodiment.
Figure 24:
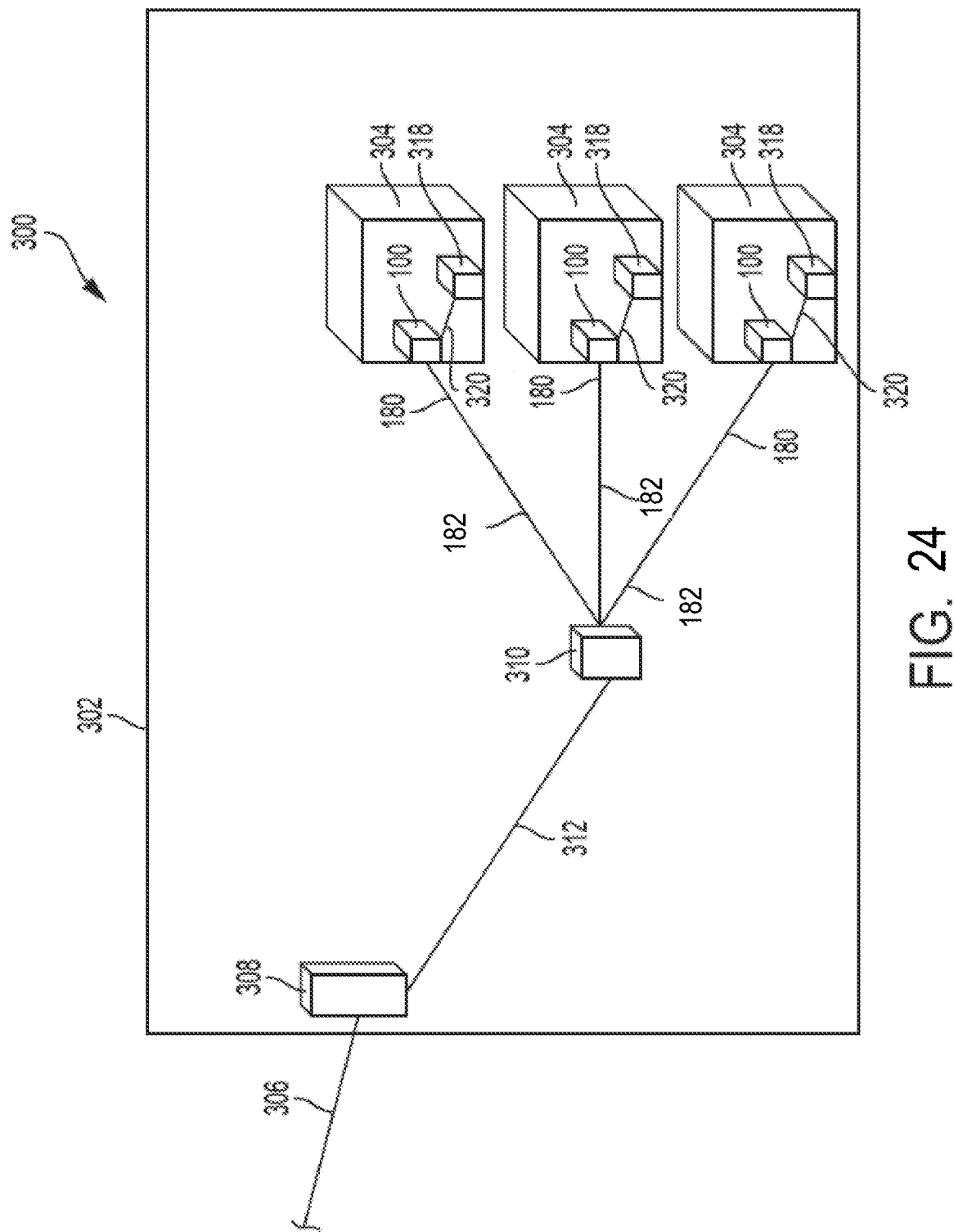
FIG. 24 is a schematic illustration of a fiber distribution system, according to another embodiment.

In some embodiments, assembly 100 is used in a fiber optic distribution system 300 for FTTx applications as illustrated in FIGS. 23 and 24. For example, assembly 100 can be used in fiber to the premises (FTTP) networks and fiber to the business (FTTB) networks.

In some FTTP embodiments, a plurality of assemblies 100 can be used to distribute fiber optic cable throughout a multi-unit building 302 having a plurality of separate units 304. Multi-unit building 302 can be, for example, an apartment building or an office building having one or more separate units 304, for example, apartments or offices, that need fiber optic cable service. Each separate unit 304 typically needs at least one single fiber connection, and the entire multi-unit building 302 needs a plurality of fibers to service every separate unit 304. To service multi-unit building 302, the fiber optic cable provider will run a fiber optic feeder cable 306 to a fiber distribution hub (FDH) 308 that splits the signal transmission. Fiber optic feeder cable 306 can include 1, 12, 24, 48, 72, or any other suitable number of fibers. FDH 308 can be outside or inside the multi-unit building 302. FDH 308 can be optically coupled to a fiber distribution terminal (FDT) 310 via a multi-fiber optic cable 312 running between FDH 308 and FDT 310. Multi-fiber cable 312 can have, for example, 12, 24, 48, 72, or 144 fibers, or any other suitable number of fibers.

FDT 310 can be any FDT described in U.S. Pat. No. 8,081,857, issued Dec. 20, 2011, and U.S. Pat. No. 8,903,215, issued Dec. 2, 2014. Each of U.S. Pat. No. 8,081,857 and U.S. Pat. No. 8,903,215 are incorporated herein by reference. For example, FDT 310 can include a rotatable spool that stores a portion of fiber optic cable 310. The spool of FDT 310 can include a plurality of adapters optically coupled to the fibers of fiber optic cable 312.

In some embodiments, as shown in FIG. 24, end portion 182 of fiber optic cable 180 can be optically coupled directly to one adapter of FDT 310 if fiber optic cable 180 is a single-fiber optic cable or to multiple adapters of FDT 310 if fiber optic cable 180 is a multi-fiber cable. In other embodiments, as shown in FIG. 23, each of a plurality of single- or multi-fiber optic drop cables 314 can be optically coupled to a respective adapter of FDT 310, which is optically coupled to one or more fibers of fiber optic cable 312. Each of fiber optic drop cables 314 can be run towards a respective separate unit 304 of multi-unit building 302. The fiber optic drop cables 314 can be optically coupled to fiber optic cable 180 of an assembly 100 via an adapter 316. Adapter 316 can be positioned outside (as shown in FIG. 23) or inside (not shown) of a separate unit 304 of multi-unit building 302. Each of the respective separate units 304 can have an end-user fiber-optic device 318 that translates the fiber cable signal into useful information. Assembly 100 optically couples fiber-optic device 318 to the respective fiber optic drop cable 314 running from FDT 310 (outside of separate unit 304) in some embodiments.

In some embodiments, fiber optic cable 180 stored on spool 108 is paid out (i.e., un wrapped from drum 130) by pulling end portion 182 of fiber optic cable 180 away from assembly 100. As fiber optic cable 180 is paid out, spool 108 rotates relative to housing 102 while component module 104 remains stationary. Fiber optic cable 180 can be easily paid out from assembly 100 while mounted to a mounting location or while removed from the mounting location. Fiber optic cable 180 is paid out until end portion 182 reaches the end of the single fiber drop from an FDT. Rotation of spool 108 of assembly 100 allows an installer to easily achieve the need length of fiber optic cable 180 to reach the end of fiber optic cable 314 while efficiently storing the excess cable on cylindrical drum 130. End portion 182 is then optically coupled to the end of fiber optic cable drop 314. For example, end portion 182 of fiber optic cable 180 can include a connector, and the end of fiber optic cable 314 can include a connector that can be optically coupled to the connector at end portion 182 using adapter 316.

In some embodiments, assembly 100 is used in new construction of multi-unit buildings and in applications in which a multi-unit building is being retrofitted with a FTTx network.

The fiber-optic device in the separate unit can then be optically coupled to fiber optic cable 180 via adapter 172 on component module 104. For example, a patch fiber optic cable 320 optically coupled to end-user fiber optic device 318 can be coupled to adapter 172 accessible to the installer through opening 162, thereby optically coupling end-user fiber optic device 318 to the network.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A fiber distribution system comprising:
 a fiber distribution terminal including:
  a first fiber optic cable,
  a first rotatable spool storing a portion of the first fiber optic cable, and
  a first adapter optically coupled to the first fiber optic cable;

an assembly, separate from the fiber distribution terminal, including:
  a second rotatable spool storing a second fiber optic cable optically coupled to the first adapter,
  a second adapter optically coupled to the second fiber optic cable;
  a third fiber optic cable optically coupled to the second adapter, and
  a component module configured to releasably couple the second adapter,
    wherein the second rotatable spool is configured to rotate relative to the component module while the component module remains stationary;
an end-user fiber optic device optically coupled to the third fiber optic cable.

2. The fiber distribution system of claim 1, wherein the assembly is positioned at a subscriber location.

3. The fiber distribution system of claim 2, wherein the subscriber location is a separate unit of a multi-unit building.

4. The fiber distribution system of claim 2, wherein the fiber distribution terminal is located outside of the subscriber location.

5. The fiber distribution system of claim 1, further comprising:
  a second assembly, separate from the fiber distribution terminal, including:
    a third rotatable spool storing a fourth fiber optic, and
    a third adapter optically coupled to the fourth fiber optic cable;
  a fifth fiber optic cable optically coupled to the third adapter; and
  a second end-user fiber optic device optically coupled to the fifth fiber optic cable,
  wherein the fiber distribution terminal further comprises a fourth adapter that optically couples the first fiber optic cable to the fourth fiber optic cable.

6. The fiber distribution system of claim 1, wherein the assembly further comprises:
  a housing, the housing defining a cavity and having a wall defining an opening through which the third fiber optic cable passes, the second rotatable spool being rotatably mounted to the housing within the cavity of the housing;
  wherein the component module is releasably coupled to the housing.

7. The fiber distribution system of claim 6, wherein the second rotatable spool is positioned between the component module and the housing.

8. The fiber distribution system of claim 6, wherein the housing, the second rotatable spool, and the component module are axially aligned along a rotational axis of the second rotatable spool.

9. The fiber distribution system of claim 1, further comprising a handle coupled to the first rotatable spool.

10. The fiber distribution system of claim 9, wherein the handle is removably attached to the first rotatable spool.

11. The fiber distribution system of claim 9, wherein the handle is fixedly attached to the first rotatable spool.

12. The fiber distribution system of claim 9, wherein the assembly is releasably attached to the first rotatable spool and the handle is attached to the first rotatable spool opposite the assembly.

13. The fiber distribution system of claim 12, wherein the assembly is releasably attached to the first rotatable spool by an interference fit connection.

14. A fiber distribution system for deploying fiber optic cable, the system comprising:
  a first spool storing a first portion of the fiber optic cable;
  an assembly coupled to the first spool, the assembly including:
    a housing defining a cavity and having a wall, the wall defining an opening for allowing a second portion of a fiber optic cable to pass there through;
    a second spool storing a third portion of the fiber optic cable and rotatably coupled to the housing within the cavity of the housing; and
    a component module releasably coupled to the housing and including an adapter configured to optically couple the fiber optic cable to another fiber optic cable; and
  a handle coupled to the first spool;
  wherein the assembly is attached to the first spool and the handle is attached to the first spool opposite the assembly.

15. The fiber distribution system of claim 14, wherein the first spool rotates relative to the handle.

16. The fiber distribution system of claim 14, wherein the handle is removably attached to the first spool.

17. The fiber distribution system of claim 14, wherein the assembly is releasably attached to the first spool.

18. The fiber distribution system of claim 17, wherein the assembly is releasably attached to the first spool by an interference fit connection.

19. The fiber distribution system of claim 14, wherein the assembly and the handle are axially aligned along a rotational axis of the first spool.

20. A fiber distribution system comprising:
  a fiber distribution terminal including:
    a first fiber optic cable,
    a first rotatable spool storing a portion of the first fiber optic cable, and
    a first adapter optically coupled to the first fiber optic cable;
  an assembly, separate from the fiber distribution terminal, including:
    a second rotatable spool storing a second fiber optic cable optically coupled to the first adapter,
    a second adapter optically coupled to the second fiber optic cable;
    a third fiber optic cable optically coupled to the second adapter; and
  an end-user fiber optic device optically coupled to the third fiber optic cable;
  wherein the assembly is releasably attached to the first rotatable spool and a handle is attached to the first rotatable spool opposite the assembly.

21. The fiber distribution system of claim 20, wherein the assembly is releasably attached to the first rotatable spool by an interference fit connection.

22. A fiber distribution system for deploying fiber optic cable, the system comprising:
  a first spool storing a first portion of the fiber optic cable;
  an assembly coupled to the first spool, the assembly including:
    a housing defining a cavity and having a wall, the wall defining an opening for allowing a second portion of a fiber optic cable to pass there through;
    a second spool storing a third portion of the fiber optic cable and rotatably coupled to the housing within the cavity of the housing; and
    a component module releasably coupled to the housing and including an adapter configured to optically couple the fiber optic cable to another fiber optic cable; and wherein the second spool is configured to rotate relative to the component module while the component module remains stationary.

23. The fiber distribution system of claim 22, wherein the assembly is releasably coupled to the first spool.

* * * * *